(12) United States Patent
Huang et al.

(10) Patent No.: US 11,831,430 B2
(45) Date of Patent: Nov. 28, 2023

(54) METHODS AND APPARATUSES FOR ENCODING AND DECODING SIGNAL FRAME

(71) Applicant: TENCENT TECHNOLOGY (SHENZHEN) COMPANY LIMITED, Guangdong (CN)

(72) Inventors: Qingbo Huang, Guangdong (CN); Wei Xiao, Guangdong (CN); Meng Wang, Guangdong (CN); Ling Zhu, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 17/899,721

(22) Filed: Aug. 31, 2022

(65) Prior Publication Data

US 2022/0416938 A1   Dec. 29, 2022

Related U.S. Application Data

(63) Continuation of application No. PCT/CN2021/111849, filed on Aug. 10, 2021.

(30) Foreign Application Priority Data

Aug. 20, 2020   (CN) .................. 202010845703.X

(51) Int. Cl.
*H04L 1/00* (2006.01)

(52) U.S. Cl.
CPC .......... *H04L 1/0041* (2013.01); *H04L 1/0045* (2013.01)

(58) Field of Classification Search
CPC ..... H04L 1/004; H04L 1/0041; H04L 1/0045; H04L 1/0061; H04L 1/0071; H03M 13/25
See application file for complete search history.

(56) References Cited

U.S. PATENT DOCUMENTS

| | | | |
|---|---|---|---|
| 6,460,154 | B1 | 10/2002 | Duxbury |
| 2005/0053285 | A1 | 3/2005 | Linkewitsch |

(Continued)

FOREIGN PATENT DOCUMENTS

| | | |
|---|---|---|
| CN | 1 528 702 | 5/2005 |
| CN | 2 276 176 | 1/2011 |

(Continued)

OTHER PUBLICATIONS

International Search Report dated Nov. 3, 2021 in International (PCT) Application No. PCT/CN2021/111849.

*Primary Examiner* — Shelly A Chase
(74) *Attorney, Agent, or Firm* — Crowell & Moring, LLP

(57) ABSTRACT

This disclosure relates to encoding and decoding methods and apparatuses. The method may include encoding an $i^{th}$ signal frame, to obtain an encoded result of the $i^{th}$ signal frame. The method may further include performing forward error correction encoding on first n signal frames, to obtain forward error correction encoded results corresponding to the first n signal frames. The first n signal frames may be signal frames located before the $i^{th}$ signal frame. The method may further include synthesizing the encoded result of the $i^{th}$ signal frame and the forward error correction encoded results corresponding to the first n signal frames, to obtain an $i^{th}$ encoded frame corresponding to the $i^{th}$ signal frame. The $i^{th}$ encoded frame may comprise a flag bit, the flag bit may be for indicating a number n, and n may be a positive integer greater than or equal to 2.

20 Claims, 10 Drawing Sheets

(56) References Cited

U.S. PATENT DOCUMENTS

| | | | |
|---|---|---|---|
| 2005/0228651 A1 | 10/2005 | Wang et al. | |
| 2011/0010608 A1 | 1/2011 | Kim et al. | |
| 2013/0227376 A1* | 8/2013 | Hwang | H03M 13/6356 |
| | | | 714/776 |
| 2014/0233483 A1 | 8/2014 | You et al. | |
| 2015/0007000 A1* | 1/2015 | Fredrickson | H03M 13/1585 |
| | | | 714/781 |
| 2016/0173233 A1 | 6/2016 | Loghin et al. | |
| 2019/0237086 A1* | 8/2019 | Huang | H04S 3/008 |

FOREIGN PATENT DOCUMENTS

| | | |
|---|---|---|
| CN | 102143367 | 8/2011 |
| CN | 103227926 | 7/2013 |
| CN | 106162374 | 11/2016 |
| CN | 107005353 | 8/2017 |
| CN | 107370488 | 11/2017 |
| CN | 107592540 | 1/2018 |
| CN | 108011686 | 5/2018 |
| CN | 109923809 | 6/2019 |
| CN | 110740334 | 1/2020 |

* cited by examiner

METHODS AND APPARATUSES FOR ENCODING AND DECODING SIGNAL FRAME

RELATED APPLICATION

This application is a continuation application of PCT Patent Application No. PCT/CN2021/111849, filed on Aug. 10, 2021, which claims priority to Chinese Patent Application No. 202010845703.X, entitled "ENCODING AND DECODING METHODS, APPARATUSES, MEDIA, AND ELECTRONIC DEVICES" filed with the China Intellectual Property Administration on Aug. 20, 2020, wherein the content of each of the above-referenced applications is incorporated herein by reference in its entirety.

FIELD OF THE TECHNOLOGY

This application relates to the technical field of computers and communications, and in particular, to encoding and decoding methods, apparatuses, media, and electronic devices.

BACKGROUND OF THE DISCLOSURE

Forward error correction (FEC), also known as forward error correction code, is a method for increasing the credibility of data communication, and specifically refers to transmitting redundant information using data, and when an error occurs in data transmission, allowing a receiving end to perform data reconstruction based on the redundant information. It can be learned that the FEC plays a significant role in the reliability of data transmission, and therefore how to use an FEC technology to improve the reliability of data transmission is a technical problem to be solved urgently.

SUMMARY

Embodiments of this disclosure provide encoding and decoding methods, apparatuses, media, and electronic devices, which can improve the reliability of data transmission using an FEC technology.

According to an aspect of the embodiments of this disclosure, provided is an encoding method. The method may include encoding an $i^{th}$ signal frame, to obtain an encoded result of the $i^{th}$ signal frame. The i may be a positive integer. The method may further include performing forward error correction encoding on first n signal frames, to obtain forward error correction encoded results corresponding to the first n signal frames. The first n signal frames may be signal frames located before the $i^{th}$ signal frame. The method may further include synthesizing the encoded result of the $i^{th}$ signal frame and the forward error correction encoded results corresponding to the first n signal frames, to obtain an $i^{th}$ encoded frame corresponding to the $i^{th}$ signal frame. The $i^{th}$ encoded frame may comprise a flag bit, the flag bit may be for indicating a number n, and n may be a positive integer greater than or equal to 2.

According to an aspect of the embodiments of this disclosure, provided is a decoding method. The method may include, in response to an $i^{th}$ encoded frame comprising a flag bit, disassembling the $i^{th}$ encoded frame to obtain an encoded result of an $i^{th}$ signal frame and forward error correction encoded results corresponding to first n signal frames. The first n signal frames may be signal frames located before the $i^{th}$ signal frame and the flag bit may be for indicating a number n, the forward error correction encoded results may be for correcting the first n signal frames, i may be a positive integer, and n may be a positive integer greater than or equal to 2. The method may further include decoding the encoded result of the $i^{th}$ signal frame to obtain the $i^{th}$ signal frame.

According to an aspect of the embodiments of this disclosure, provided is a transcoding method. The method may include obtaining an encoded result of an $i^{th}$ signal frame and encoded results corresponding to first n signal frames. The first n signal frames may be signal frames located before the $i^{th}$ signal frame. The method may further include generating forward error correction encoded results corresponding to the first n signal frames according to the encoded results corresponding to the first n signal frames. The method may further include synthesizing the encoded result of the $i^{th}$ signal frame and the forward error correction encoded results corresponding to the first n signal frames, to obtain an $i^{th}$ encoded frame. The $i^{th}$ encoded frame may comprise a flag bit, the flag bit may be for indicating a number n, i may be a positive integer, and n may be a positive integer greater than or equal to 2.

According to an aspect of the embodiments of this disclosure, provided is a transcoding method. The method may include, in response to an $i^{th}$ encoded frame comprising a flag bit, disassembling the $i^{th}$ encoded frame to obtain an encoded result of an $i^{th}$ signal frame and forward error correction encoded results corresponding to first n signal frames. The first n signal frames may be signal frames located before the $i^{th}$ signal frame and the flag bit may be for indicating a number n, the forward error correction encoded results may be for correcting the first n signal frames, i may a positive integer, and n may be a positive integer greater than or equal to 2. The method may further include generating, based on the encoded result of the $i^{th}$ signal frame, a transcoded bitstream of the $i^{th}$ encoded frame.

According to an aspect of the embodiments of this disclosure, provided is a computer-readable medium, storing a computer program, and the computer program, when executed by a processor, implementing the encoding method, the decoding method, or the transcoding method in the foregoing embodiments.

According to an aspect of the embodiments of this disclosure, provided is an electronic device, including: one or more processors; and a storage apparatus, configured to store one or more programs, and the one or more programs, when executed by the one or more processors, causing the one or more processors to implement the encoding method, the decoding method, or the transcoding method in the foregoing embodiments.

According to an aspect of the embodiments of this disclosure, provided is a computer program product or a computer program, the computer program product or the computer program including computer instructions, stored in a computer-readable storage medium. A processor of an electronic device reads the computer instructions from the computer-readable storage medium, and the processor executes the computer instructions, so that the electronic device performs the encoding method, the decoding method, or the transcoding method provided in the foregoing embodiments.

In the encoding process, first an $i^{th}$ signal frame is encoded, forward error correction is performed on first n signal frames separately, the first n signal frames being signal frames located before the $i^{th}$ signal frame, and then an encoded result of the $i^{th}$ signal frame and forward error correction encoded results respectively corresponding to the first n signal frames are synthesized, to generate an $i^{th}$ encoded frame, the $i^{th}$ encoded frame including a flag bit, the flag bit being used for indicating a number n, and n being a natural number greater than or equal to 2. In the technical solution, a number of signal frames corresponding to forward error correction encoded results included in an encoded frame is dynamically indicated by using a new encoded frame structure, so that a transmit end (also referred to as an encoding end) can flexibly adjust a number n according to an actual situation (for example, network status and the like), to further ensure the reliability of data transmission when the network status is poor and also reduce the occupation of transmission bandwidth when the network status is good.

BRIEF DESCRIPTION OF THE DRAWINGS

Accompanying drawings herein are incorporated into this specification and constitute a part of this specification, show embodiments that conform to this disclosure, and are used for describing a principle of this disclosure together with this specification. Apparently, the accompanying drawings described below are merely some embodiments of this disclosure, and a person of ordinary skill in the art may further obtain other accompanying drawings according to the accompanying drawings without creative efforts. In the accompanying drawings.

DESCRIPTION OF EMBODIMENTS

"Plurality of" mentioned in this specification means two or more. The "and/or" describes an association relationship for associated objects and represents that three relationships may exist. For example, A and/or B may represent the following three cases: Only A exists, both A and B exist, and only B exists. The character "/" in this specification generally indicates an "or" relationship between the associated objects.

Figure 1:
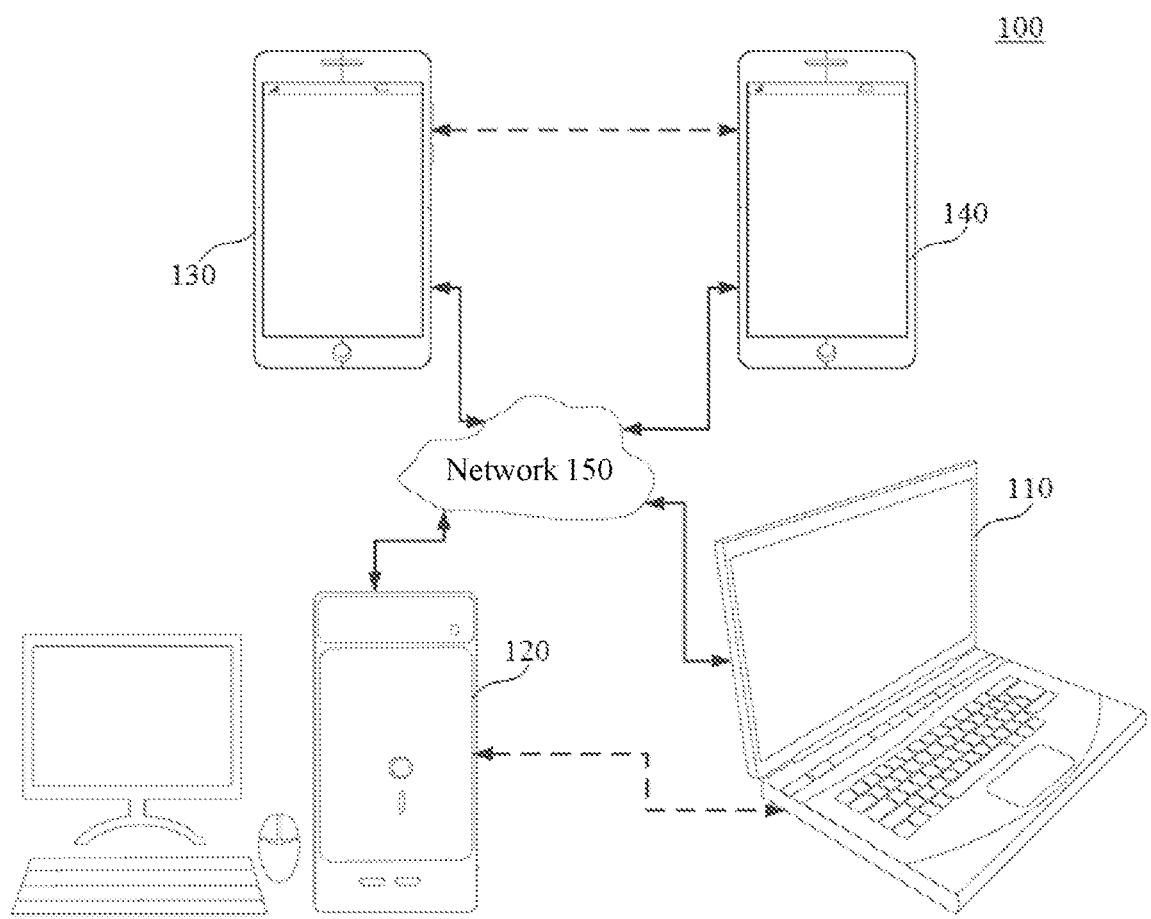
FIG. 1 is a schematic diagram of an exemplary system architecture applicable to an embodiment of this disclosure.

FIG. 1 is a schematic diagram of an exemplary system architecture to which a technical solution according to an embodiment of this disclosure may be applied.

As shown in FIG. 1, a system architecture 100 includes a plurality of electronic devices, which can communicate with each other over, for example, a network 150. For example, the system architecture 100 may include a first electronic device 110 and a second electronic device 120 interconnected through the network 150. In the embodiments of FIG. 1, the first electronic device 110 and the second electronic device 120 perform unidirectional data transmission.

For example, the first electronic device 110 may code video data (for example, a video picture stream acquired by the first electronic device 110) for transmission through the network 150 to the second electronic device 120, encoded video data is transmitted in a form of one or more encoded video bitstreams, and the second electronic device 120 may receive the encoded video data from the network 150, decode the encoded video data to recover the video data, and display video pictures according to the recovered video data. Certainly, the first electronic device 110 may alternatively code audio data (for example, an audio signal stream acquired by the first electronic device 110) for transmission through the network 150 to the second electronic device 120, encoded audio data is transmitted in a form of one or more encoded audio bitstreams, and the second electronic device 120 may receive the encoded audio data from the network 150, decode the encoded audio data to recover the audio data, and play audio signals according to the recovered audio data.

In some embodiments, the system architecture 100 may include a third electronic device 130 and a fourth electronic device 140 for performing bidirectional data transmission. The bidirectional transmission occurs, for example, during a video conference. For the bidirectional data transmission, any of the third electronic device 130 and the fourth electronic device 140 may code video data to be transmitted through the network 150 to the other one of the third electronic device 130 and the fourth electronic device 140. Any of the third electronic device 130 and the fourth electronic device 140 may alternatively receive encoded video data transmitted by the other one of the third electronic device 130 and the fourth electronic device 140, decode the encoded video data to recover the video data, and display a video picture on an accessible display apparatus according to the recovered video data. Certainly, bidirectional transmission of encoded audio data may also be performed between the third electronic device 130 and the fourth electronic device 140, for example, during Voice over Internet Protocol IP (VoIP)-based voice transmission.

In the embodiments of FIG. 1, the first electronic device 110, the second electronic device 120, the third electronic device 130, and the fourth electronic device 140 each may be a server, a personal computer, and a smartphone, but the principles disclosed herein are not limited thereto. The embodiments of this disclosure are applicable to a laptop computer, a tablet computer, a media player, and/or a dedicated video conferencing device. The network 150 refers to any number of networks, including, but not limited to, wired and/or wireless communication networks, that transmit encoded video data among the first electronic device 110, the second electronic device 120, the third electronic device 130, and the fourth electronic device 140. The network 150 can exchange data in circuit switching and/or packet switching channels. The network may include a telecommunication network, a local area network, a wide area network, and/or the Internet.

Figure 2:
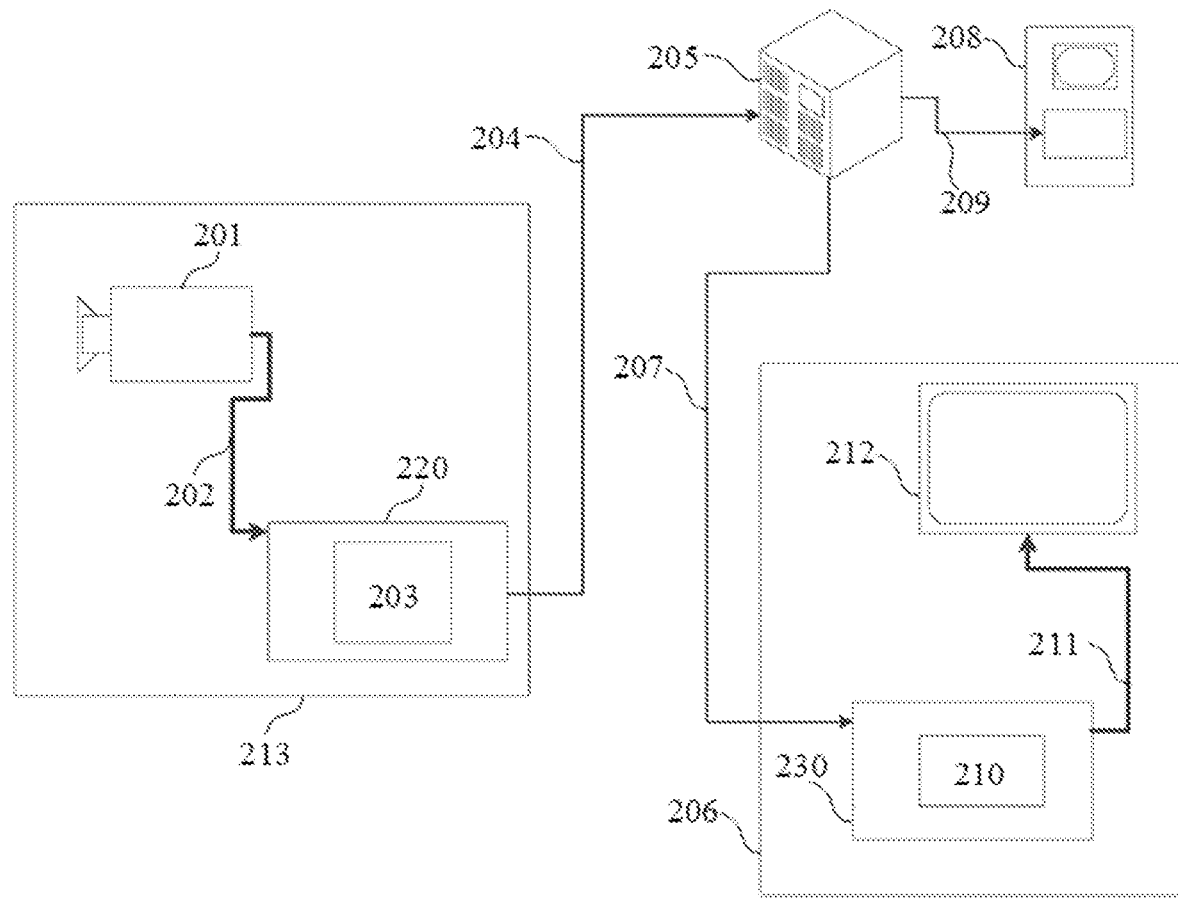
FIG. 2 is a schematic diagram of a video encoding apparatus and a video decoding apparatus in a streaming transmission system according to an embodiment of this disclosure.

In some embodiments, FIG. 2 illustrates a placement manner of an encoding apparatus and a decoding apparatus in a streaming transmission system. The encoding apparatus and decoding apparatus may code and decode video data, or may code and decode audio data. The technical solutions of the embodiments of this disclosure are applicable to an application scenario that supports video or audio transmission, including but not limited to, a video conference, digital television (TV), storing of a compressed video on a digital medium, and the like, and are also applicable to an audio data transmission scenario, for example, a scenario in which a voice call is performed through a network. The medium includes, but is not limited to, a Compact Disk (CD), a Digital Versatile Disc (DVD), a storage stick, and the like.

In some embodiments, the streaming transmission system may include an acquisition subsystem 213, which may include a video source 201 such as a digital camera, and the video source 201 creates an uncompressed video picture stream 202. In some embodiments, the video picture stream 202 includes samples photographed by the video source 201. In contrast to encoded video data 204 (or a encoded video bitstream 204), the video picture stream 202 is depicted by using a thick line to emphasize a high data volume of the video picture stream. The video picture stream 202 may be processed by an electronic device 220. The electronic device 220 includes an encoding apparatus 203 coupled to the video source 201. The encoding apparatus 203 may include hardware, software, or a combination of software and hardware, to implement or realize the aspects of the subject matter described below. In contrast to the video picture stream 202, the encoded video data 204 (or the encoded video bitstream 204) is depicted by using a thin line to emphasize a low data volume of the encoded video data 204 (or the encoded video bitstream 204), which can be stored on a streaming transmission server 205 for future use. One or more streaming transmission client subsystems, such as a client subsystem 206 and a client subsystem 208 in FIG. 2, may access the streaming transmission server 205 to retrieve a copy 207 and a copy 209 of the encoded video data 204. The client subsystem 206 includes a decoding apparatus 210 in an electronic device 230. The decoding apparatus 210 decodes the copy 207 of the encoded video data 204 and generates an output video picture stream 211 that can be displayed on a display 212 (for example, a display) or another display apparatus. In some streaming transmission systems, the encoded video data 204, the copy 207, and the copy 209 (for example, a video bitstream) may be encoded according to some video encoding/compression standards.

The electronic device 220 and the electronic device 230 shown in FIG. 2 may include other components not shown in the figure. For example, the electronic device 220 may include a decoding apparatus and the electronic device 230 may also include an encoding apparatus. In addition, the encoding apparatus and the decoding apparatus shown in FIG. 2 may alternatively code and decode audio data.

The implementation details of the technical solutions in the embodiments of this disclosure are described in detail in the following.

Figure 3:
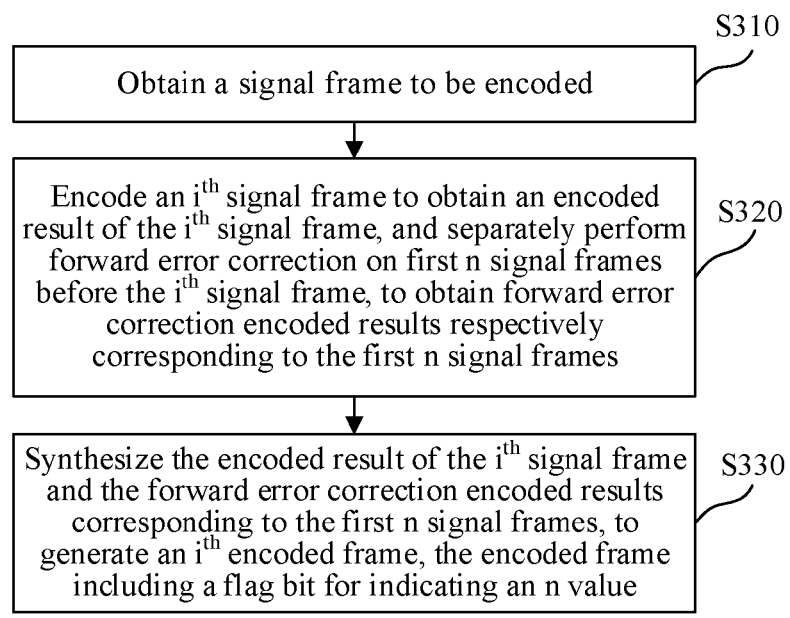
FIG. 3 is a flowchart of an encoding method according to an embodiment of this disclosure.

FIG. 3 is a flowchart of an encoding method according to an embodiment of this disclosure. The encoding method may be executed by a device having a computing processing function, for example, may be executed by a terminal or a server. Referring to FIG. 3, the encoding method includes at least S310 to S330, and the details are in the following:

S310: Obtain a signal frame to be encoded.

In some embodiments, the signal frame to be encoded may be an uncoded multimedia signal frame, for example, an audio signal frame, a video signal frame, a picture signal frame, and the like. In some embodiments, the signal frame to be encoded may be obtained by an acquisition device or a signal frame may be generated by a computer. For example, an audio signal frame is acquired by a microphone, a video signal frame and an image signal frame are acquired by a camera, and the like. The signal frame to be encoded may be a signal frame to be transmitted to a receiving end, or may be a signal frame to be encoded and then stored.

S320: Code an $i^{th}$ signal frame to obtain an encoded result of the $i^{th}$ signal frame, and separately perform forward error correction on first n signal frames before the $i^{th}$ signal frame, to obtain forward error correction encoded results respectively corresponding to the first n signal frames.

The first n signal frames are signal frames located before the $i^{th}$ signal frame. The first n signal frames are used for forward error correction, and therefore these signal frames are also referred to as forward error correction encoded frames.

In some embodiments, the encoding an $i^{th}$ signal frame may include performing encoding according to a preset encoding policy, for example, encoding an audio signal frame by an Opus coder; or, encoding a video signal frame by a video coder based on standards such as H.264 and VP8. The processes of separately performing forward error correction encoding on the first n signal frames are similar to the process of encoding the $i^{th}$ signal frame.

In some embodiments, n may be any natural number other than 0, for example, 1, 2, 3, and the like, and theoretically, n may also be 0, but in this case, a current encoded frame does not include an FEC encoded result of a previous signal frame. In some embodiments, n may be a value greater than or equal to 2.

S330: Synthesize the encoded result of the $i^{th}$ signal frame and the forward error correction encoded results respectively corresponding to the first n signal frames, to generate an $i^{th}$ encoded frame, the encoded frame including a flag bit for indicating an n value.

The $i^{th}$ encoded frame refers to an encoded frame corresponding to the $i^{th}$ signal frame.

In some embodiments, the process of synthesizing the encoded result of the $i^{th}$ signal frame and the forward error correction encoded results respectively corresponding to the first n signal frames may include the following: according to an order of signal frames, arranging and combining the encoded result of the $i^{th}$ signal frame and the forward error correction encoded results respectively corresponding to the first n signal frames, to ensure that the encoded frame corresponding to the $i^{th}$ signal frame includes the encoded result of the $i^{th}$ signal frame and the forward error correction encoded results respectively corresponding to the first n signal frames. In addition, a flag bit needs to be set in the obtained encoded frame, for indicating an n value, to indicate to a decoding end a number of signal frames corresponding to the forward error correction encoded results included in the encoded frame.

In some embodiments, the n value may be set according to network status, the n value being inversely correlated with the network status. In some embodiments, when the network status is good and a packet loss rate is small, n may be set to a small value; and on the contrary, when the network status is poor and the packet loss rate is large, n may be set to a large value.

In some embodiments, the $i^{th}$ encoded frame may further include: an indication bit and a first field corresponding to each of the first n signal frames, where the indication bit corresponding to each signal frame is used for indicating a length of a forward error correction encoded result of each signal frame, and the first field corresponding to each signal frame is used for recording the forward error correction encoded result of each signal frame. In addition, the $i^{th}$ encoded frame may also include: a second field corresponding to the $i^{th}$ signal frame, and the second field is used for recording the encoded result of the $i^{th}$ signal frame.

In some embodiments, packet loss during transmission of an encoded frame is a probabilistic event, no packet loss is likely to occur, and however at least the quality of the encoded result of the currently transmitted $i^{th}$ signal frame needs to be ensured regardless of whether packet loss occurs. Therefore, a high bit rate is used for the encoded result of the $i^{th}$ signal frame; moreover, the forward error correction encoded results of the first n signal frames are not needed when there is no packet loss, and therefore a low bit rate may be used, so that fewer bits are occupied and proper utilization of bandwidth resources is ensured.

In some embodiments, the first bit rate may be set to be greater than n second bit rates. The first bit rate is a bit rate of the encoded result of the $i^{th}$ signal frame. The n second bit rates are bit rates of the forward error correction encoded results of the first n signal frames, and one forward error correction encoded result corresponds to one second bit rate. The second bit rate may be dynamically adjusted according to an actual situation. In some embodiments, the first bit rate and the n second bit rates descend in a back-to-front order. For example, a first bit rate is set to 16 kbps, a bit rate of a forward error correction encoded result of an $(i-1)^{th}$ signal frame is set to 14 kbps, a bit rate of a forward error correction encoded result of an $(i-2)^{th}$ signal frame is set to 10 kbps, and the like.

In some embodiments, packet loss feedback information may alternatively be determined according to receiving status information fed back by a receiving end of an encoded frame, and then the second bit rate is adjusted according to the packet loss feedback information. For example, when packet loss information fed back by the receiving end indicates that the packet loss rate is large, the second bit rate may be increased, to ensure the reliability of data transmission by increasing an amount of data transmitted; and on the contrary, when the packet loss information fed back by the receiving end indicates that the packet loss rate is small, the second bit rate may be reduced, to reduce the occupation of transmission bandwidth.

In the technical solutions of the embodiments shown in FIG. 3, a number of signal frames corresponding to FEC encoded results included in an encoded frame can be dynamically indicated by using a new encoded frame structure, and the number n can be flexibly adjusted based on the network status, so that the reliability of data transmission can be ensured when the network status is poor and the occupation of transmission bandwidth can be reduced when the network status is good.

Figure 4:
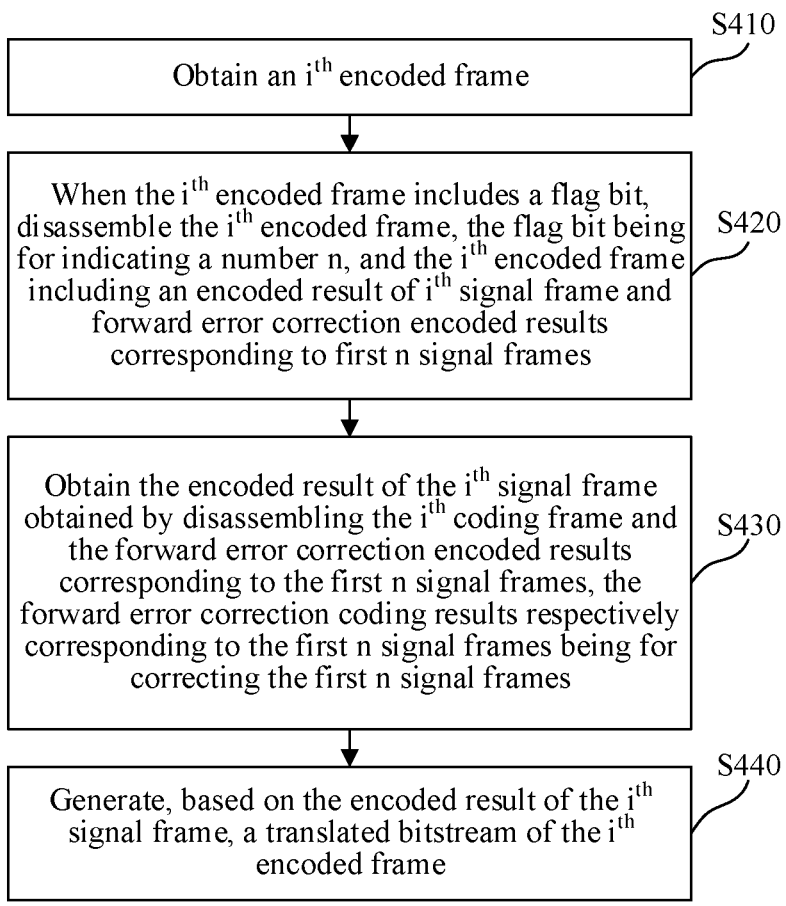
FIG. 4 is a flowchart of a transcoding method according to an embodiment of this disclosure.

FIG. 4 is a flowchart of a transcoding method according to an embodiment of this disclosure. The transcoding method may be executed by a device having a computing processing function, for example, may be executed by a terminal or a server. Referring to FIG. 4, the transcoding method includes at least S410 to S440, and the details are in the following:

S410: Obtain an $i^{th}$ encoded frame.

In some embodiments, the $i^{th}$ encoded frame may be an encoded frame generated by the embodiments shown in FIG. 3. Certainly, in other embodiments, the $i^{th}$ encoded frame may alternatively be an encoded frame generated using existing standards.

S420: When the $i^{th}$ encoded frame includes a flag bit, disassemble the $i^{th}$ encoded frame, the flag bit being used for indicating a number n, and the $i^{th}$ encoded frame including an encoded result of an $i^{th}$ signal frame and forward error correction encoded results respectively corresponding to first n signal frames.

In some embodiments, after the $i^{th}$ encoded frame is obtained, whether the $i^{th}$ encoded frame includes the flag may be determined first. For example, the flag bit may be located in a frame header of the $i^{th}$ encoded frame, and in this case, the frame header of the $i^{th}$ encoded frame may be decoded first, to determine whether the flag bit is included. When the $i^{th}$ encoded frame does not include the flag bit, transcoding of the $i^{th}$ encoded frame by using the method shown in FIG. 4 may not be performed, that is, the transcoding of the $i^{th}$ encoded frame may be skipped directly.

When the $i^{th}$ encoded frame does not include the flag bit, but the $i^{th}$ encoded frame includes a forward error correction encoded result of a previous signal frame, the $i^{th}$ encoded frame may alternatively be transcoded into a bitstream that does not include any forward error correction encoded result.

S430: Obtain the encoded result of the $i^{th}$ signal frame obtained by disassembling the $i^{th}$ encoded frame and the forward error correction encoded results respectively corresponding to the first n signal frames, the forward error correction encoded results respectively corresponding to the first n signal frames being used for correcting the first n signal frames.

In some embodiments, the $i^{th}$ encoded frame includes: an indication bit and a first field corresponding to each of the first n signal frames. In this case, during disassembling of the $i^{th}$ encoded frame, the forward error correction encoded result of each signal frame may be obtained according to the indication bit and the first field corresponding to each signal frame included in the $i^{th}$ encoded frame.

In some embodiments, the $i^{th}$ encoded frame includes a second field corresponding to the $i^{th}$ signal frame. In this case, during disassembling of the $i^{th}$ encoded frame, the encoded result of the $i^{th}$ signal frame may be obtained according to the second field included in the $i^{th}$ encoded frame.

S440: Generate, based on the encoded result of the $i^{th}$ signal frame, a bitstream after the $i^{th}$ encoded frame is transcoded.

In another way of expression, the technical solutions of the embodiments shown in FIG. 4 include: for an $i^{th}$ encoded frame, when the $i^{th}$ encoded frame includes a flag bit, disassembling the $i^{th}$ encoded frame, to obtain an encoded result of an $i^{th}$ signal frame and forward error correction encoded results respectively corresponding to first n signal frames; and generating, based on the encoded result of the $i^{th}$ signal frame, a bitstream after the $i^{th}$ encoded frame is transcoded.

In some embodiments, the encoded result of the $i^{th}$ signal frame may be directly used as the bitstream after the $i^{th}$ encoded frame is transcoded; or, the encoded result of the $i^{th}$ signal frame may be decoded to obtain the $i^{th}$ signal frame, and then the $i^{th}$ signal frame may be encoded again by using a target protocol to obtain the bitstream after the transcoding. The target protocol refers to a protocol corresponding to an expected bitstream.

In some embodiments, when no $j^{th}$ encoded frame corresponding to a $j^{th}$ signal frame in the first n signal frames is obtained, an encoded result of the $j^{th}$ signal frame may be recovered according to a forward error correction encoded result of the $j^{th}$ signal frame. In the embodiments of this disclosure, n may be a value greater than or equal to 2, there may be a plurality of encoded frames after the $j^{th}$ encoded frame and including the forward error correction encoded result of the $j^{th}$ signal frame. To ensure the recovery effect, an encoded frame closest to the $j^{th}$ encoded frame may be selected to recover the encoded result of the $j^{th}$ signal frame.

In some embodiments, when the $i^{th}$ encoded frame is a code frame closest to the $j^{th}$ encoded frame, because the forward error correction encoded result of the $j^{th}$ signal frame can be obtained by disassembling the $i^{th}$ encoded frame, the bitstream after the $j^{th}$ encoded frame is transcoded can be generated directly according to the forward error correction encoded result of the $j^{th}$ signal frame. For example, the forward error correction encoded result of the $j^{th}$ signal frame may be directly used as the bitstream after the $j^{th}$ encoded frame is transcoded; or, the forward error correction encoded result of the $j^{th}$ signal frame may be decoded, and then encoded again by using a target protocol, to obtain a bitstream after the transcoding.

When the $i^{th}$ encoded frame is not an encoded frame closest to the $j^{th}$ encoded frame, a target encoded frame closest to the $j^{th}$ encoded frame may be determined first, and because the forward error correction encoded result of the $j^{th}$ signal frame can be obtained by disassembling the target encoded frame, the bitstream after the $j^{th}$ encoded frame is transcoded can be generated directly according to the forward error correction encoded result of the $j^{th}$ signal frame. Certainly, the target encoded frame herein needs to include the forward error correction encoded result of the $j^{th}$ signal frame.

The technical solutions of the embodiments shown in FIG. 4 can implement the transcoding of the encoded frame obtained in the embodiments shown in FIG. 3, and further may be provided to a device which cannot decode the encoded frame in the embodiments shown in FIG. 3, thereby improving the compatibility of the system.

Figure 5:
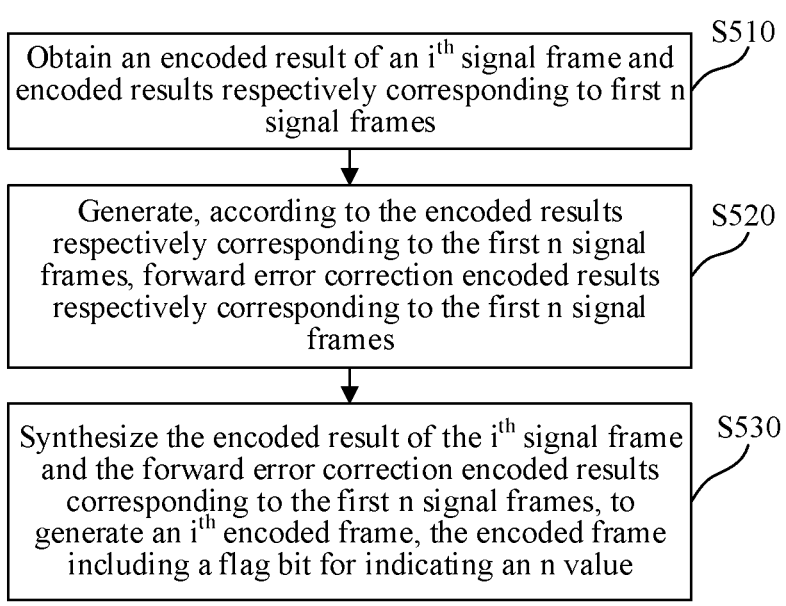
FIG. 5 is a flowchart of a transcoding method according to an embodiment of this disclosure.

FIG. 5 is a flowchart of a transcoding method according to an embodiment of this disclosure. The transcoding method may be executed by a device having a computing processing function, for example, may be executed by a terminal or a server. Referring to FIG. 5, the transcoding method includes at least S510 to S530, and the details are in the following:

S510: Obtain an encoded result of an $i^{th}$ signal frame and encoded results respectively corresponding to first n signal frames.

In some embodiments, the encoded result of the $i^{th}$ signal frame and the encoded results respectively corresponding to the first n signal frames may be standard bitstreams that do not include forward error correction encoding information.

S520: Generate, according to the encoded results respectively corresponding to the first n signal frames, forward error correction encoded results respectively corresponding to the first n signal frames.

In some embodiments, the encoded results respectively corresponding to the first n signal frames may be used as the forward error correction encoded results respectively corresponding to the first n signal frames, but by using this method, a finally generated encoded frame may be caused to occupy a large bandwidth during transmission. Therefore, the encoded results respectively corresponding to the first n signal frames may be re-quantized.

In some embodiments, the encoded results respectively corresponding to the first n signal frames may be decoded to obtain the decoded results respectively corresponding to the first n signal frames, then the decoded results respectively corresponding to the first n signal frames may be re-quantized, to obtain the quantization results respectively corresponding to the first n signal frames, and finally, the quantization results corresponding to the first n signal frames are separately encoded again, to generate the forward error correction encoded results respectively corresponding to the first n signal frames. In some embodiments, the decoding and encoding before and after the re-quantization process may be normal decoding and encoding, for example, decoding and encoding by Opus coder and decoder. However, by using this manner, the complexity is relatively high, and therefore entropy decoding and entropy encoding may be used as the decoding and encoding before and after the re-quantization process, so that the decoding and encoding rate can be improved effectively, and the complexity can be reduced.

In some embodiments, after decoding the encoded results respectively corresponding to the first n signal frames, obtained decoded results each include a subframe gain and excitation signal energy. In this case, the re-quantization of the decoded results respectively corresponding to the first n signal frames may include: increasing a value of the subframe gain, equivalently reducing the excitation signal energy, then performing quantization processing based on the excitation signal energy to obtain a number of data bits, when a number of data bits per unit time is less than a target bit rate, stopping increasing the value of subframe gain and stopping reducing the excitation signal energy, and using a real-time value of the subframe gain and real-time excitation signal energy as quantization results. By using this method, downlink bandwidth occupied by the finally generated encoded frame can be effectively reduced.

S530: Synthesize the encoded result of the $i^{th}$ signal frame and the forward error correction encoded results respectively corresponding to the first n signal frames, to generate an $i^{th}$ encoded frame, the encoded frame including a flag bit for indicating an n value.

That is, the $i^{th}$ encoded frame includes a flag bit, and the flag bit is used for indicating the number n.

In some embodiments, details of S530 are similar to processing details of S330 shown in FIG. 3 in the foregoing embodiments, and details are not repeated.

In some embodiments, a designated encoded frame corresponding to the $i^{th}$ signal frame may alternatively be generated according to the encoded result of the $i^{th}$ signal frame and a forward error correction encoded result of a previous signal frame. The designated encoded frame includes only the forward error correction encoded result of the previous signal frame. In this case, the flag bit may not be set in the encoded frame, thereby implementing forward compatibility with an existing system.

In the technical solutions of the embodiments shown in FIG. 5, an ordinary bitstream (for example, a standard bitstream) may be converted into an encoded frame in the embodiments shown in FIG. 3, which can also improve the compatibility of the system.

Figure 6:
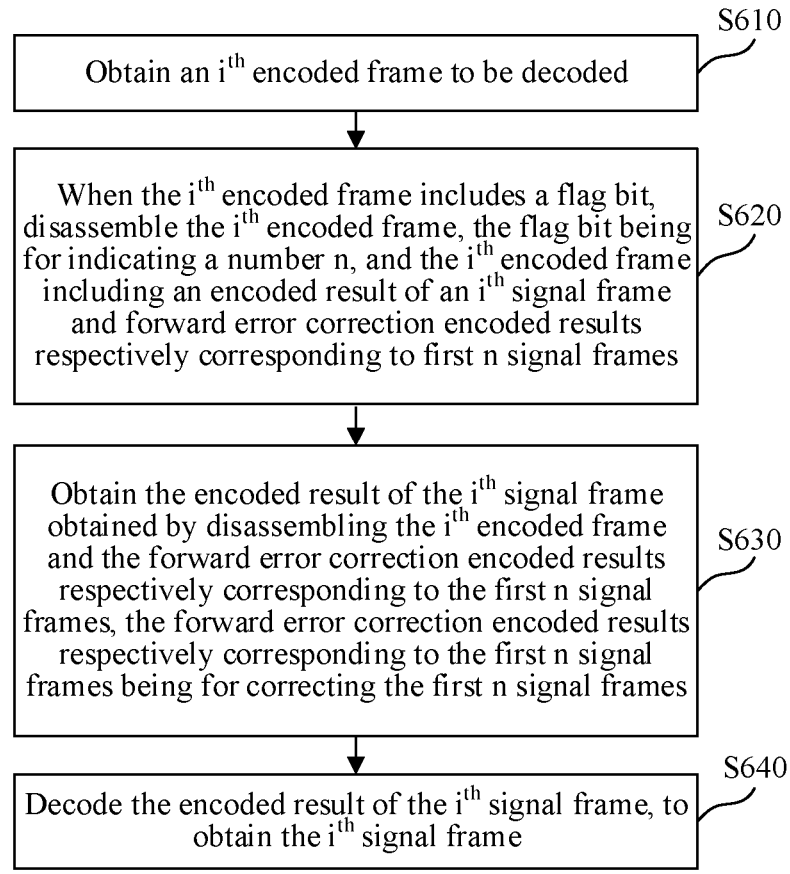
FIG. 6 is a flowchart of a decoding method according to an embodiment of this disclosure.

FIG. 6 is a flowchart of a decoding method according to an embodiment of this disclosure. The decoding method may be executed by a device having a computing processing function, for example, may be executed by a terminal or a server. Referring to FIG. 6, the decoding method includes at least S610 to S640, and the details are in the following:

S610: Obtain an $i^{th}$ encoded frame to be decoded.

In some embodiments, the $i^{th}$ encoded frame may be the encoded frame generated in the embodiments shown in FIG. 3, or may be the encoded frame obtained after transcoding in the embodiments shown in FIG. 5. Certainly, in other embodiments, the $i^{th}$ encoded frame may alternatively be an encoded frame generated using existing standards.

S620: When the $i^{th}$ encoded frame includes a flag bit, disassemble the $i^{th}$ encoded frame, the flag bit being used for indicating a number n, and the $i^{th}$ encoded frame including an encoded result of an $i^{th}$ signal frame and forward error correction encoded results respectively corresponding to first n signal frames.

In some embodiments, details of S620 are similar to processing details of S420 shown in FIG. 4 in the foregoing embodiments, and details are not repeated.

S630: Obtain the encoded result of the $i^{th}$ signal frame obtained by disassembling the $i^{th}$ encoded frame and the forward error correction encoded results respectively corresponding to the first n signal frames, the forward error correction encoded results respectively corresponding to the first n signal frames being used for correcting the first n signal frames.

In some embodiments, details of S630 are similar to processing details of S430 shown in FIG. 4 in the foregoing embodiments, and details are not repeated.

S640: Decode the encoded result of the $i^{th}$ signal frame, to obtain the $i^{th}$ signal frame.

In another way of expression, the technical solutions of the embodiments shown in FIG. 6 include: for an $i^{th}$ encoded frame, when the $i^{th}$ encoded frame includes a flag bit, disassembling the $i^{th}$ encoded frame, to obtain an encoded result of an $i^{th}$ signal frame and forward error correction encoded results respectively corresponding to first n signal frames; and then, decoding the encoded result of the $i^{th}$ signal frame, to obtain the $i^{th}$ signal frame.

In some embodiments, the encoded result of the $i^{th}$ signal frame may be decoded according to a standard protocol used for encoding the $i^{th}$ signal frame. For example, when the $i^{th}$ signal frame is encoded by an Opus coder, the encoded result of the $i^{th}$ signal frame may be decoded by an Opus decoder.

In some embodiments, when no $j^{th}$ encoded frame corresponding to a $j^{th}$ signal frame in the first n signal frames is obtained, the $j^{th}$ signal frame may be recovered according to a forward error correction encoded result of the $j^{th}$ signal frame. In the embodiments of this disclosure, n may be a value greater than or equal to 2, there may be a plurality of encoded frames after the $j^{th}$ encoded frame and including the forward error correction encoded result of the $j^{th}$ signal frame. To ensure the recovery effect, an encoded frame closest to the $j^{th}$ encoded frame may be selected to recover the $j^{th}$ signal frame.

In some embodiments, when the $i^{th}$ encoded frame is a code frame closest to the $j^{th}$ encoded frame, because the forward error correction encoded result of the $j^{th}$ signal frame can be obtained by disassembling the $i^{th}$ encoded frame, the forward error correction encoded result of the $j^{th}$ signal frame may be decoded directly, to generate the $j^{th}$ signal frame according to an obtained decoded result. For example, the decoded result may be directly used as the $j^{th}$ encoded frame.

When the $i^{th}$ encoded frame is not an encoded frame closest to the $j^{th}$ encoded frame, a target encoded frame closest to the $j^{th}$ encoded frame may be determined first, and because the forward error correction encoded result of the $j^{th}$ signal frame can be obtained by disassembling the target encoded frame, the forward error correction encoded result of the $j^{th}$ signal frame may be decided directly, to generate the $j^{th}$ signal frame according to an obtained decoded result. Certainly, the target encoded frame herein needs to include the forward error correction encoded result of the $j^{th}$ signal frame.

In technical solutions of the embodiments shown in FIG. 6, a decoding end is enabled to determine, according to the flag bit in the $i^{th}$ encoded frame, a number of signal frames on which forward error correction encoding is performed, further decode the $i^{th}$ encoded frame according to the number, and reconstruct an unreceived data frame according to a forward error correction encoded result, thereby improving the reliability of data transmission.

The following describes, in combination with FIG. 7 to FIG. 13, implementation details of the technical solutions of the embodiments of this disclosure by using encoding and decoding processes during transmission of an audio signal as an example.

In an application scenario of this disclosure, during a VoIP call, when a receiving end cannot receive a packet normally due to poor network status, the receiving end cannot fully recover voice, resulting in abnormal situations, such as VoIP sound quality damage and lagging. To solve the problem, the FEC technology is introduced. In some embodiments, after a transmit end encapsulates and transmits a current audio signal frame (hereinafter, referred to as a current signal frame), in a next data packet, specific bandwidth is still allocated to encapsulate and transmit the current signal frame, that is, a "redundant packet" is brought in another data packet. In this case, additional data redundancy of the current signal frame is established at the transmit end. In the transmission process, once the current signal frame is lost, content of the lost packet can be recovered by using the "redundant packet" after the "redundant packet" arrives at the receiving end. In some embodiments, a transmission system for an audio signal may be shown in FIG. 7, mainly including: an acquisition client 701, an upstream media proxy 702, a back-end server 703, a downstream media proxy 704, and a playback client 705.

The acquisition client 701 may also be referred to as a transmit client, including a coder (also referred to as an encoding apparatus), which mainly codes an acquired audio signal and encapsulates the signal into a data packet for transmission.

The upstream media proxy 702 is also referred to as an upstream transcriptor, which is an upstream media gateway, and has a main function of converting, after receiving a bitstream using a new version of a protocol and transmitted by the acquisition client 701, the bitstream into a bitstream using an old version of the protocol, so that a playback client using the old version of the protocol can decode normally, thereby implementing forward compatibility. Certainly, when the bitstream received by the upstream media proxy 702 is one of old versions of the protocol, the upstream media proxy 702 may directly forward the bitstream to the back-end server 703. The bitstream of the new version of the protocol involved in the embodiments of this disclosure are introduced in the following. The bitstream using the old version of the protocol may be a standard bitstream that does not include FEC information.

The back-end server 703 includes a protocol interface, and because a VoIP communication system may need to implement interoperability of different protocols, for example, the VoIP protocol, the Public Switched Telephone Network (PSTN) protocol, and the like, the back-end server 703 may also implement interoperability of a plurality of protocols. In some embodiments, a transcoder may also be introduced into the back-end server 703 for completing the interoperability. For example, the process of transcoding a bitstream using a protocol 1 to a bitstream using a protocol 2 includes: calling a decoder corresponding to the protocol 1, to recover an audio signal frame, and then calling a coder corresponding to the protocol 2 to code the audio signal frame, to output a bitstream corresponding to the protocol 2. Certainly, in this embodiment of this disclosure, when the upstream media proxy 702 has transcoded the bitstream transmitted to the back-end server 703 and bitstreams in the back-end server 703 are all bitstreams of a same protocol version, the back-end server 703 does not need to perform transcoding, but the back-end server 703 may perform processing such as audio mixing.

The downstream media proxy 704 is symmetrical to the upstream media proxy 702, and has a main function of converting a bitstream using an old version of the protocol and transmitted by the back-end server 703 into a bitstream using a new version of the protocol and then transmitting the converted bitstream to the playback client 705. In some embodiments, when it is determined that the playback client 705 uses an old version of the protocol, the downstream media proxy 704 directly forwards, after receiving a bitstream using the old version of the protocol and transmitted by the back-end server 703, the bitstream to the playback client 705; and when it is determined that the playback client 705 uses a new version of the protocol, the downstream media proxy 704 converts, after receiving a bitstream using an old version of the protocol transmitted by the back-end server 703, the bitstream into a bitstream using the new version of the protocol, and forwards the converted bitstream to the playback client 705.

Figure 7:
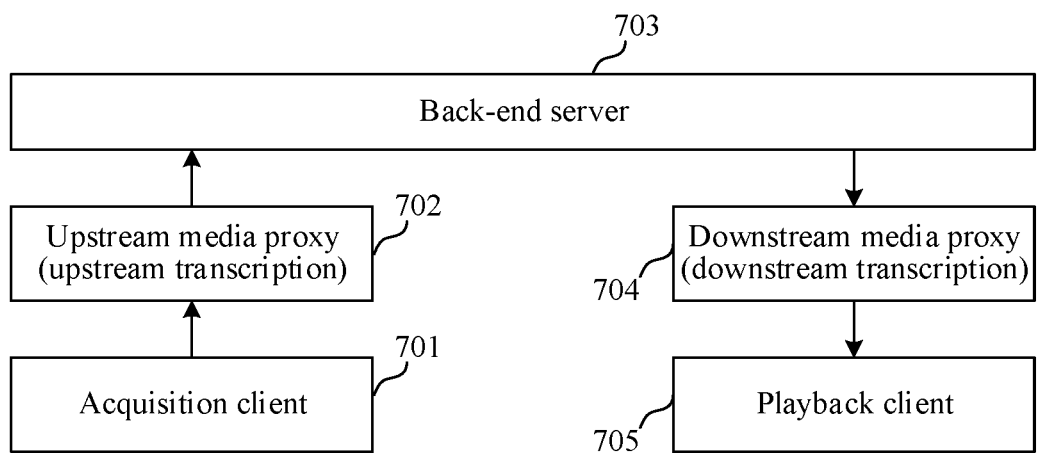
FIG. 7 is a schematic diagram of an audio signal transmission system according to an embodiment of this disclosure.

In the system architecture shown in FIG. 7, the bitstream protocol used in a network segment between the upstream media proxy 702 and the downstream media proxy 704 may be maintained as an old version of the protocol, so that forward compatibility management can be implemented. A combination of the upstream media proxy 702, the back-end server 703, and the downstream media proxy 704 shown in FIG. 7 is only one implementation of the network segment, and in an end-to-end transmission process, other methods may alternatively be used to ensure that there is a network segment capable of transmitting a bitstream of the old version of the protocol.

Figure 8:
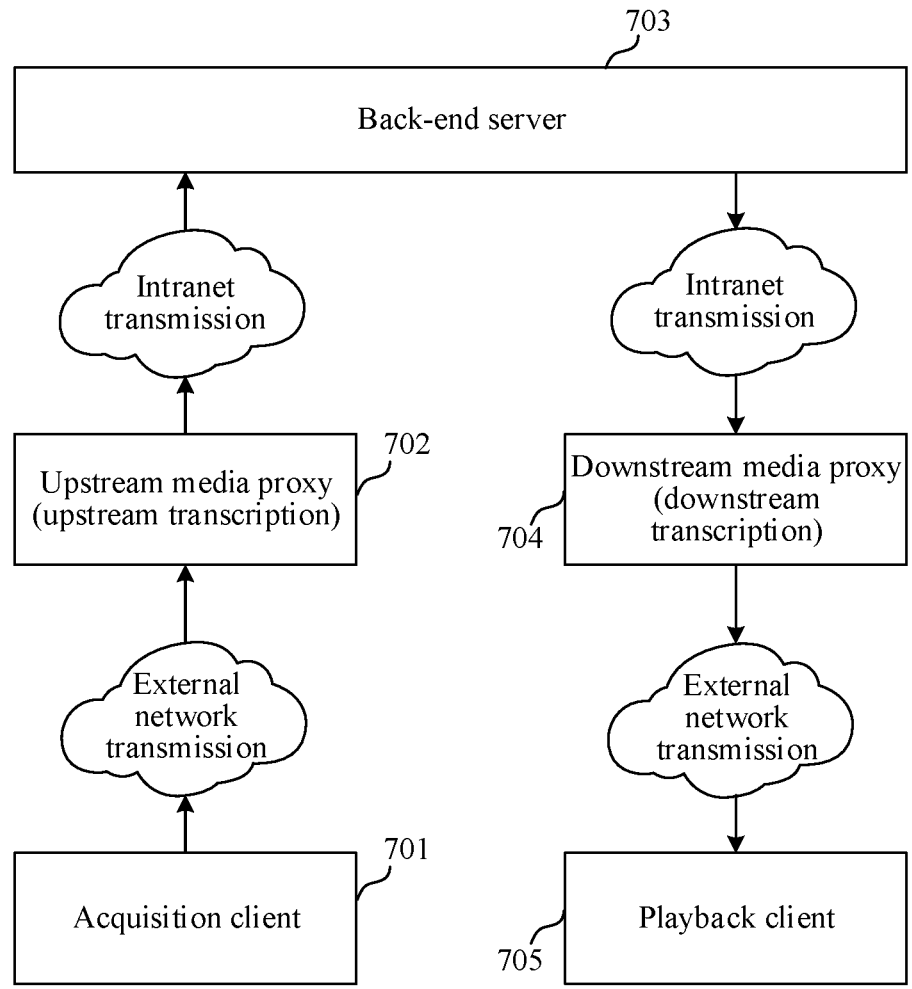
FIG. 8 is a schematic diagram of an audio signal transmission system according to an embodiment of this disclosure.

For the system architecture shown in FIG. 7, in a specific application scenario, as shown in FIG. 8, data transmission is performed through an intranet of a service party between the upstream media proxy 702 and the back-end server 703, and between the back-end server 703 and the downstream media proxy 704; and data transmission is performed through an external network between the acquisition client 701 and the upstream media proxy 702, and between the downstream media proxy 704 and the playback client 705. In the application scenario shown in FIG. 8, a network segment for transmitting a bitstream of an old version of the protocol may be formed in an intranet of a service party, which can further support transmission of audio data by a client using different versions of the protocol.

When versions of the protocol used by the acquisition client 701 and the playback client 705 participating in communication are the same, that is, there is no compatibility problem, the upstream media proxy 702 and the downstream media proxy 704 may not be disposed in FIG. 7 and FIG. 8.

Figure 9:
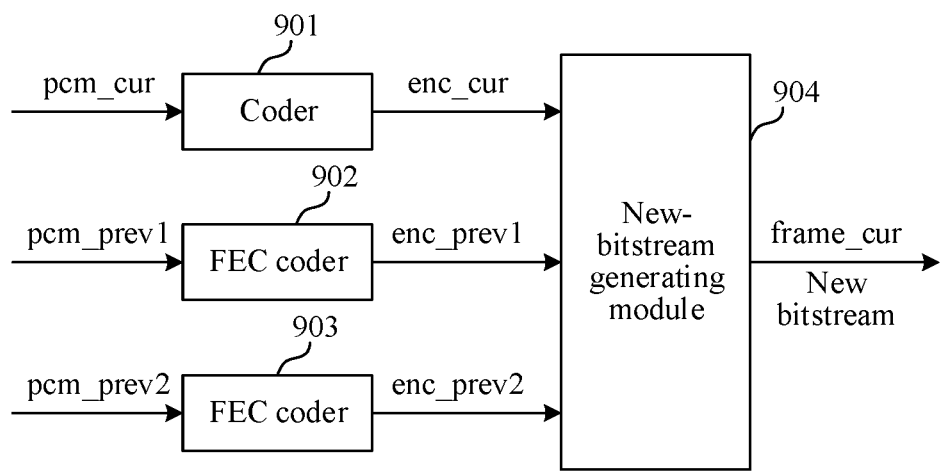
FIG. 9 is a schematic diagram of a processing process of an acquisition client shown in FIG. 7 and FIG. 8.

The processing process of the acquisition client 701, the upstream media proxy 702, the downstream media proxy 704, and the playback client 705 are described in detail in the following:

In some embodiments, the acquisition client 701 may also be referred to as a transmit end or an encoding end, and mainly compresses an audio signal into a bitstream by using a coder. The acquisition client may code an audio signal frame by using a coder corresponding to a new version of the protocol. As shown in FIG. 9, it is assumed that an audio signal corresponding to a current signal frame is pcm_cur, an audio signal corresponding to the $1^{st}$ frame before the current signal frame is pcm_prev1, and an audio signal corresponding to the $2^{nd}$ frame before the current signal frame is pcm_prev2 (it is assumed that the current signal frame is an $i^{th}$ signal frame, the $1^{st}$ frame before the current signal frame is an $(i-1)^{th}$ frame and the $2^{nd}$ frame before the current signal frame is an $(i-2)^{th}$ frame), the audio signal pcm_cur may be encoded by using a coder 901, to obtain an encoded result enc_cur; the audio signal pcm_prev1 is encoded by using an FEC coder 902, to obtain an encoded result enc_prev1; and the audio signal pcm_prev2 is encoded by using an FEC coder 903, to obtain an encoded result enc_prev2. Then, enc_cur, enc_prev1, and enc_prev2 are together inputted to a new-bitstream generating module 904, to obtain a current encoded frame frame_cur corresponding to the current signal frame. The current encoded frame frame_cur is a new bitstream, and the new bitstream is a bitstream generated according to a new version of the protocol.

The coder 901 may be a commonly used coder for encoding an audio signal, for example, an Opus coder; and the processing processes of the FEC coder 902 and the FEC coder 903 are consistent with that of the coder 901.

The encoded frame obtained using the encoding method shown in FIG. 9 includes FEC encoded results of first two signal frames. To facilitate identifying of an encoded frame in the new bitstream, in some embodiments, the encoded frame structure in the new bitstream may be shown in FIG. 10: a field "Flag" in the $1^{st}$ byte is used for identifying a number of recoverable frames, which may be used for distinguishing the new bitstream proposed in the embodiments of this disclosure from a conventional bitstream, and for example, in the embodiments shown in FIG. 9, a value indicated by "Flag" is 2; a field "Prev-2 length" in the $2^{nd}$ byte is used for recording a length of an FEC encoded result of the audio signal pcm_prev2; bytes of the "Prev-2 length" after the $2^{nd}$ byte are used for indicating the FEC encoded result of the audio signal pcm_prev2; next, the field "Prev-1 length" of one byte is used for recording a length of an FEC encoded result of the audio signal pcm_prev1, and bytes of the "Prev-1" length are used for indicating the FEC encoded result of the audio signal pcm_prev1; and in addition, the encoded frame structure also includes a CUR field used for indicating an encoded result of a current signal frame.

In some embodiments, bit rates of enc_cur, enc_prev1, and enc_prev2 may further be adjusted. In some embodiments, for example, in an Opus coder, a signal with a sampling rate of 16 kHz already has a quite good quality at a bit rate of 16 kbps, and considering an actual packet loss situation, enc_cur, enc_prev1, and enc_prev2 need to use different bit rates. For example, enc_cur may use a relatively high bit rate, and enc_prev1 and enc_prev2 use relatively low bit rates. The advantage of such a configuration is: packet loss is a probabilistic event, no packet loss is likely to occur, and however at least the quality of enc_cur needs to be ensured regardless of whether packet loss occurs; therefore, a high bit rate may be used for enc_cur; moreover, enc_prev1 and enc_prev2 are not needed when there is no packet loss, and therefore, a low bit rate may be used, so that fewer bits are occupied and proper utilization of bandwidth resources is ensured. In some embodiments, the bit rate of enc_cur may be set to 16 kbps, and the bit rates of enc_prev1 and enc_prev2 may be set to 12 kbps; or, the bit rate of enc_cur may be set to 16 kbps, the bit rate of enc_prev1 may be set to 14 kbps, and the bit rate of enc_prev2 may be set to 10 kbps.

In some embodiments, the transmit end (the acquisition client 701 shown in FIG. 7 and FIG. 8) may adjust the bit rates of the encoded result enc_prev1 and the encoded result enc_prev2 according to the packet loss information fed back by the receiving end (the playback client 705 shown in FIG. 7 and FIG. 8) of the encoded frame (the packet loss information may be in the receive feedback information transmitted by the receiving end). For example, when the packet loss information fed back by the receiving end indicates that the packet loss rate is large, the bit rates of the encoded result enc_prev1 and the encoded result enc_prev2 may be improved; and on the contrary, when the packet loss information fed back by the receiving end indicates that the packet loss rate is small, the bit rates of the encoded result enc_prev1 and the encoded result enc_prev2 may be reduced.

Figure 10:
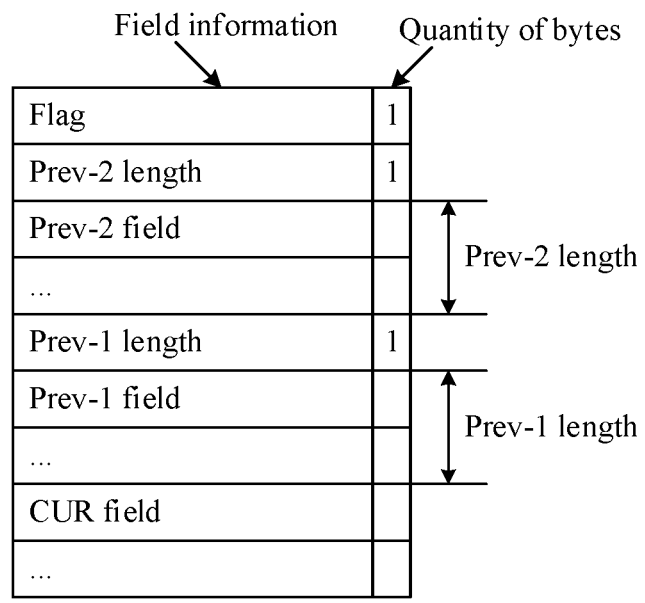
FIG. 10 is a schematic structural diagram of an encoded frame according to an embodiment of this disclosure.

FIG. 9 and FIG. 10 illustrate by an example in which a current encoded frame includes FEC encoded results of first two signal frames. In other embodiments, the current encoded frame may include FEC encoded results of any n signal frames before the current signal frame, where n may be any natural number other than 0, for example, 1, 2, 3, and the like, and theoretically, n may also be 0, but in this case, the current encoded frame does not include an FEC encoded result of a previous signal frame; and in addition, the value of n needs to be identified by a Flag field in the current encoded frame. In some embodiments, the transmit end may set the value of n according to network status; for example, when the network status is good and a packet loss rate is small, n may be set to a small value; and on the contrary, when the network status is poor and the packet loss rate is large, n may be set to a large value. It can be learned that, in this embodiment of this disclosure, by designing a new encoded frame structure, a number of signal frames corresponding to FEC encoded results included in the encoded frame is dynamically indicated by using the new encoded frame structure, and then the encoded frame may be flexibly adjusted based on the network status, so that the quality of a voice call can be guaranteed when the network status is poor.

The following continues to illustrate by an example in which a current encoded frame includes FEC encoded results of first two signal frames:

In some embodiments, the upstream media proxy 702 shown in FIG. 7 and FIG. 8 mainly converts a bitstream using a new version of a protocol into a bitstream using an old version of the protocol. The bitstream using the new version of the protocol is a bitstream generated by the encoding method shown in FIG. 9 and having the structure shown in FIG. 10, and the bitstream using the old version of the protocol may be a current standard bitstream.

Figure 11:
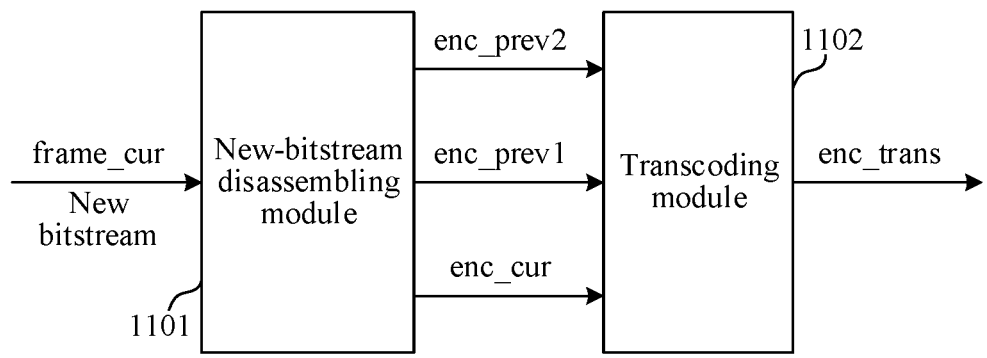
FIG. 11 is a schematic diagram of a processing process of an upstream media proxy shown in FIG. 7 and FIG. 8.

In some embodiments, as shown in FIG. 11, a current encoded frame frame_cur in a new bitstream is inputted to a new-bitstream disassembling module 1101, to obtain a standard bitstream with a total of three frames of information, namely, enc_cur, enc_prev1, and enc_prev2. The new-bitstream disassembling module 1101 may perform disassembling based on the encoded frame structure shown in FIG. 10. enc_cur is an encoded result of an audio signal pcm_cur, enc_prev1 is an FEC encoded result of an audio signal pcm_prev1, enc_prev2 is an FEC encoded result of an audio signal pcm_prev2. Then, a transcoding module 1102 is called to output a standard bitstream enc_trans. In some embodiments, when first two encoded frames of the current encoded frame are all received, it means that enc_prev1 and enc_prev2 are useless information and may be discarded. In this case, a transcoded result enc_trans outputted by the transcoding module 1102 includes enc_cur.

When the $1^{st}$ encoded frame before the current encoded frame is lost and the $2^{nd}$ encoded frame before the current encoded frame is received normally, it means that enc_prev2 is useless information and may be discarded. In this case, a transcoded result enc_trans outputted by the transcoding module 1102 includes two parts, namely, enc_cur and enc_prev1. enc_cur is a standard bitstream corresponding to the current encoded frame (the standard bitstream does not include FEC encoding information), enc_prev1 serves as a standard bitstream corresponding to the $1^{st}$ encoded frame before the current encoded frame, and both can be transmitted separately.

When the $1^{st}$ encoded frame before the current encoded frame is received normally and the $2^{nd}$ encoded frame before the current encoded frame is lost, it means that enc_prev1 is useless information and may be discarded. In this case, a transcoded result enc_trans outputted by the transcoding module 1102 includes two parts, namely, enc_cur and enc_prev2. enc_cur is a standard bitstream corresponding to the current encoded frame (the standard bitstream does not include FEC encoding information), enc_prev2 serves as a standard bitstream corresponding to the $2^{nd}$ encoded frame before the current encoded frame, and both can be transmitted separately.

When the first two encoded frames of the current encoded frame are lost, it means that both enc_prev1 and enc_prev2 are useful information. In this case, the transcoded result enc_trans outputted by the transcoding module 1102 includes three parts, namely, enc_cur, enc_prev1, and enc_prev2, where enc_cur, enc_prev1, and enc_prev2 can be transmitted separately.

When an encoded frame j is lost, a plurality of encoded frames after the encoded frame j are received normally, and the plurality of encoded frames include FEC encoding information corresponding to the encoded frame j, a standard bitstream corresponding to the encoded frame j may be generated according to an encoded frame closest to the encoded frame j. For example, when the encoded frame j is lost, an encoded frame j+1 and an encoded frame j+2 are received normally, and the encoded frame j+1 and the encoded frame j+2 both include FEC encoding information corresponding to the encoded frame j, the standard bitstream corresponding to the encoded frame j may be recovered according to the FEC encoding information in the encoded frame j+1. By using the method for recovering through the closest encoded frame, the continuity of an obtained standard bitstream can be ensured, so that the continuity of an audio signal finally obtained through decoding can be ensured.

After processing by the upstream media proxy 702, a bitstream using a new version of the protocol may be ensured to present in a form of a standard bitstream and be transmitted to a next node, thereby implementing forward compatibility.

In some embodiments, what is inputted by the downstream media proxy 704 shown in FIG. 7 and FIG. 8 is a bitstream using an old version of the protocol (in this embodiment, the bitstream using the old version of the protocol is the standard bitstream), and then an appropriate transcoding policy may be selected according to an attribute of the playback client 705. In some embodiments, when the playback client 705 uses a standard bitstream, the downstream media proxy 704 may directly forward the standard bitstream to the playback client 705. When the playback client 705 uses a bitstream of a new version of the protocol (in this embodiment, the bitstream using the new version of the protocol is a bitstream generated by the encoding method shown in FIG. 9 and having the structure shown in FIG. 10), the downstream media proxy 704 needs to transcode the inputted standard bitstream.

Figure 12:
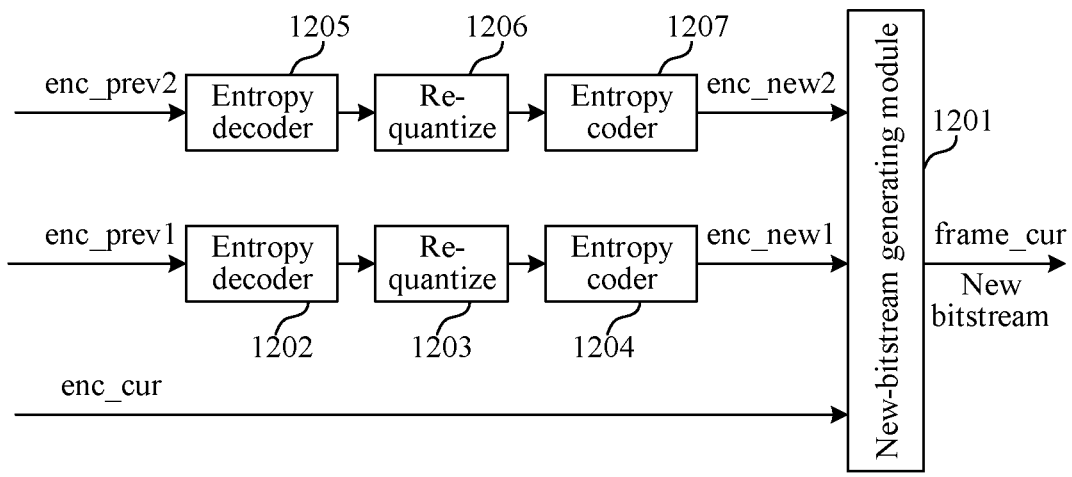
FIG. 12 is a schematic diagram of a processing process of a downstream media proxy shown in FIG. 7 and FIG. 8.
Figure 13:
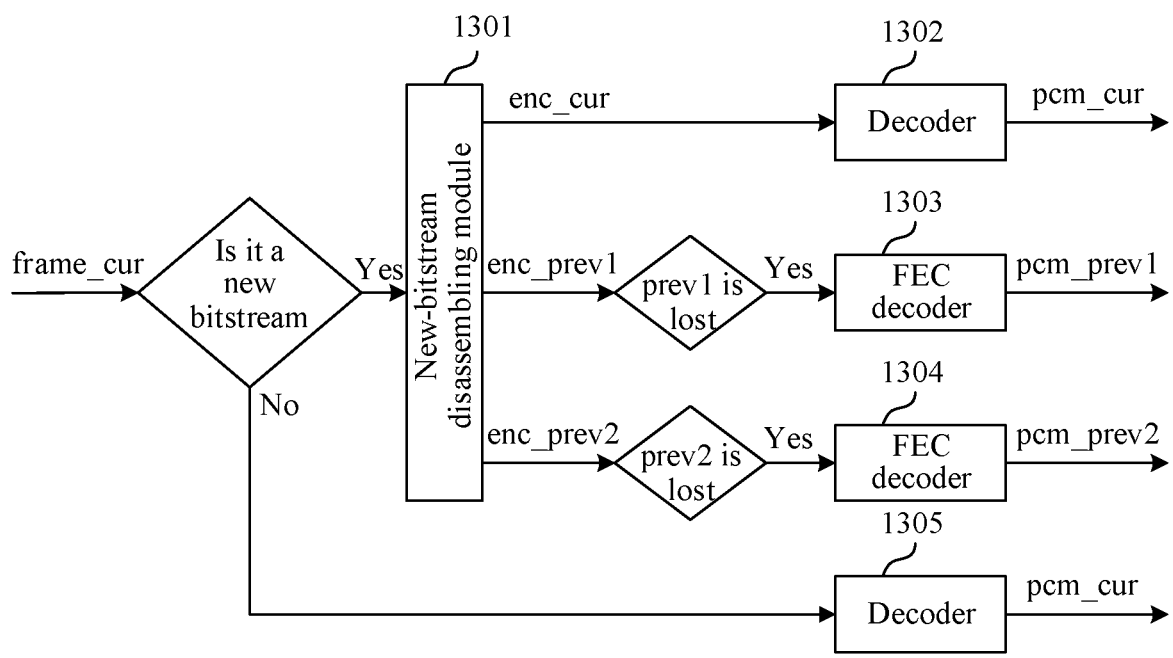
FIG. 13 is a schematic diagram of a processing process of a playback client shown in FIG. 7 and FIG. 8.

In some embodiments, the process of transcoding the inputted standard bitstream by the downstream media proxy 704 is shown in FIG. 12: It is assumed that an $n^{th}$ encoded result currently received by the downstream media proxy 704 and not including FEC encoding information is enc_cur, an $(n-1)^{th}$ encoded result is enc_prev1, and an $(n-2)^{th}$ encoded result is enc_prev2, enc_cur is directly inputted to the new-bitstream generating module 1201; enc_prev1 is entropy decoded by an entropy decoder 1202, to obtain a plurality of encoding parameters, and then these encoding parameters are inputted to a re-quantizing module 1203 for re-quantization to be then inputted to the entropy coder 1204, to obtain a processed bitstream enc_new1; enc_prev2 is entropy decoded by an entropy decoder 1205, to obtain a plurality of encoding parameters, and then these encoding parameters are inputted to a re-quantizing module 1206 for re-quantization to be then inputted to the entropy coder 1207, to obtain a processed bitstream enc_new2; and Finally, an encoded frame frame_cur in a new bitstream is generated from enc-new2, enc-new1, and enc_cur in the new-bitstream generating module 1201.

In some embodiments, in FIG. 12, the reason for why enc_prev1 and enc_prev2 need to be first processed to obtain enc-new1 and enc-new2, to be then inputted to the new-bitstream generating module 1201 is that: it is assumed that the bit rates corresponding to the enc_cur, enc_prev1, and enc_prev2 received by the downstream media proxy 704 are all 16 kbps, when the three successive encoded results are directly combined and transmitted to the playback client, the bit rate is 16-16-16, which may lead to an increase in downlink bandwidth, and therefore secondary quantization (that is, re-quantization) and encoding may be performed on enc_prev1 and enc_prev2, to reduce the occupation of the downlink bandwidth. A solution proposed in this embodiment of this disclosure is in the following:

enc-prev1 and enc-prev2 are decoded by the entropy decoder (that is, the entropy decoders 1202 and 1205 in FIG. 12), to obtain a relevant parameter set, which may include parameters such as a subframe gain, a Line Spectral Frequency (LSF), a pitch, long term prediction (LTP), and excitation signal energy. From the perspective of quantization distortion, the consumption of bits can be reduced by increasing the subframe gain and reducing the excitation signal energy. Therefore, re-quantization logic in this embodiment of this disclosure (that is, processing logic of the re-quantizing modules 1203 and 1206 in FIG. 12) may be: increasing a current subframe gain (it is assumed that an increment amount is delta) and meanwhile equivalently reducing the excitation signal energy (a decrement amount is delta); in this process, the excitation signal energy after reduction is re-quantized, and a number of bits per unit time is counted; when the number of bits per unit time is less than a target bit rate, the process is suspended; and otherwise, the subframe gain is further increased and meanwhile the excitation signal energy is reduced equivalently, and the operations are repeated until the number of bits per unit time is less than the target bit rate.

After the subframe gain and excitation signal energy are re-quantized, the subframe gain and excitation signal after re-quantization are encoded by the entropy coders (that is, the entropy coders 1204 and 1207 in FIG. 12), and bitstreams of original LSF, pitch, and LTP are combined to generate enc-new1 and enc-new2. By the re-quantization operation proposed in this embodiment of this disclosure, the downlink bandwidth occupied by a new bitstream generated according to enc-new1 and enc-new2 can be effectively reduced.

In FIG. 12, by using an entropy decoder and an entropy coder, decoding and encoding speeds can be effectively increased, and the requirement for performance of the downstream media proxy 704 is also low. Certainly, in other embodiments, the entropy decoder and entropy coder in FIG. 12 may alternatively be replaced with commonly used standard decoder and standard coder (for example, an Opus) for decoding and encoding.

In the embodiments shown in FIG. 12, when enc-new2 and enc-new1 may be respectively used as the FEC encoded results of the first two signal frames, the encoded frame in the new bitstream outputted by the downstream media proxy 704 includes the FEC encoded results of the first two signal frames. In this case, the encoded frame in the new bitstream may be marked by using the encoded frame structure shown in FIG. 10, and details may be referred to in the technical solutions of the foregoing embodiments, and are not repeated.

In some embodiments, a main function of the playback client 705 shown in FIG. 7 and FIG. 8 is decoding and playing a bitstream after receiving the bitstream. When what is received by the playback client 705 is a standard bitstream, the playback client 705 may decode by using a normal decoding method. When what is received by the playback client 705 is a bitstream using a new version of the protocol, the processing process of the playback client 705 may be shown in FIG. 13: it is assumed that a current encoded frame received by the playback client 705 is frame_cur, whether frame_cur is a bitstream using a new version of the protocol is detected, and when frame_cur is a standard bitstream that does not include FEC encoding information, decoding is performed directly by using a decoder 1305, to obtain a current signal frame pcm_cur. When frame_cur is a bitstream using a new version of the protocol, frame_cur is inputted to a new-bitstream disassembling module 1301, to obtain a standard bitstream with a total of three frames of information, namely, enc_cur, enc_prev1, and enc_prev2.

The new-bitstream disassembling module 1301 may perform disassembly based on the encoded frame structure shown in FIG. 10. enc_cur is an encoded result of a current signal frame r, enc_prev1 is an FEC encoded result of the $1^{st}$ frame before the current signal frame, and enc_prev2 is an FEC encoded result of the $2^{nd}$ frame before the current signal frame. After obtaining enc_cur, enc_prev1, and enc_prev2, enc_cur is inputted to a decoder 1302, to obtain a current signal frame pcm_cur. Processing of enc_prev1 and enc_prev2 may be divided into the following cases:

When the $1^{st}$ encoded frame (that is, prev1) before the current encoded frame frame_cur is lost, enc_prev1 is inputted to an FEC decoder 1303, and an output result of the decoder 1303 is used as the $1^{st}$ signal frame pcm_prev1 before the current signal frame; and certainly, when the $1^{st}$ encoded frame before the current encoded frame frame_cur is received normally, enc_prev1 may be discarded.

When the $2^{nd}$ encoded frame (that is, prev2) before the current encoded frame frame_cur is lost, enc_prev2 is inputted to an FEC decoder 1304, and an output result of the decoder 1304 is used as the $2^{nd}$ signal frame pcm_prev2 before the current signal frame; and certainly, when the $2^{nd}$ encoded frame before the current encoded frame frame_cur is received normally, enc_prev2 may be discarded.

The decoder 1302 may be a commonly used decoder, for example, an Opus decoder; and the processing process of the FEC decoder 1303 and the FEC decoder 1304 are consistent with that of the decoder 1302.

The description is provided above by using a process of encoding and decoding an audio signal during transmission as an example, but the technical solutions of the embodiments of this disclosure can also be extended to the processing of other multimedia data, for example, the method may alternatively implement encoding and decoding of a video signal during transmission, and further a number of signal frames corresponding to FEC encoded results included in an encoded frame can be dynamically indicated by using a new encoded frame structure and can be flexibly adjusted based on the network status, so that the reliability of data transmission can be ensured when the network status is poor.

The following describes apparatus embodiments of this disclosure, and the apparatus embodiments may be used for performing the method in the foregoing embodiment of this disclosure. For details not disclosed in the apparatus embodiments of this disclosure, reference may be made to the foregoing method embodiments of this disclosure.

Figure 14:
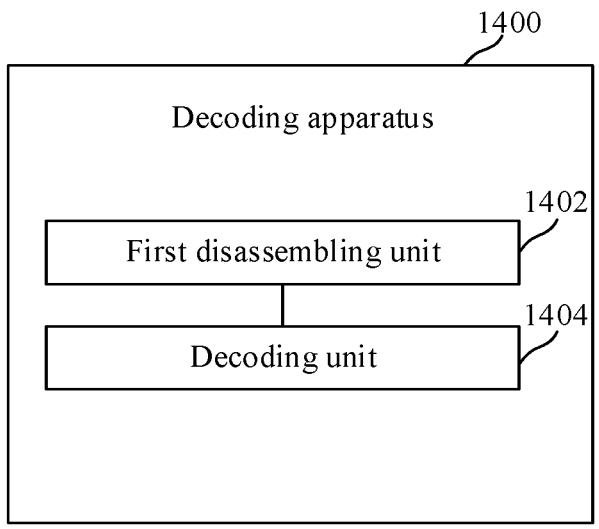
FIG. 14 is a block diagram of a decoding apparatus according to an embodiment of this disclosure.

FIG. 14 is a block diagram of a decoding apparatus according to an embodiment of this disclosure. The decoding apparatus may be disposed in a device having a computing processing function, for example, may be disposed in a terminal or a server.

Referring to FIG. 14, a decoding apparatus 1400 according to an embodiment of this disclosure includes: a first disassembling unit 1402 and a decoding unit 1404.

The first disassembling unit 1402 is configured to: for an $i^{th}$ encoded frame, when the $i^{th}$ encoded frame includes a flag bit, disassemble the $i^{th}$ encoded frame, to obtain an encoded result of an $i^{th}$ signal frame and forward error correction encoded results corresponding to first n signal frames;

the first n signal frames being signal frames located before the $i^{th}$ signal frame and the flag bit being used for indicating a number n; the forward error correction encoded results being used for correcting the first n signal frames, i being a positive integer, and n being a positive integer greater than or equal to 2; and the decoding unit 1404 is configured to decode the encoded result of the $i^{th}$ signal frame, to obtain the $i^{th}$ signal frame.

In some embodiments, based on the foregoing solution, when no $j^{th}$ encoded frame corresponding to the $j^{th}$ signal frame in the first n signal frames is obtained, the decoding unit 1404 is further configured to: when the $i^{th}$ encoded frame is a code frame closest to the $j^{th}$ encoded frame, decode the forward error correction encoded result of the $j^{th}$ signal frame, to generate the $j^{th}$ signal frame according to an obtained decoded result; and the forward error correction encoded result of the $j^{th}$ signal frame is obtained by disassembling the $i^{th}$ encoded frame.

In some embodiments, based on the foregoing solution, when no $j^{th}$ encoded frame corresponding to the $j^{th}$ signal frame in the first n signal frames is obtained, the decoding unit 1404 is further configured to: when the $i^{th}$ encoded frame is not an encoded frame closest to the $j^{th}$ encoded frame, determine a target encoded frame closest to the $j^{th}$ encoded frame, and decode a forward error correction encoded result of the $j^{th}$ signal frame, to generate the $j^{th}$ signal frame according to an obtained decoded result; and the forward error correction encoded result of the $j^{th}$ signal frame is obtained by disassembling the target encoded frame.

In some embodiments, based on the foregoing solution, the $i^{th}$ encoded frame further includes: an indication bit and a first field corresponding to each signal frame in the first n signal frames, where the indication bit is used for indicating a length of a forward error correction encoded result of each signal frame, and the first field is used for recording the forward error correction encoded result of each signal frame; and The first disassembling unit 1402 is configured to: obtain the forward error correction encoded result of each signal frame according to the indication bit and the first field corresponding to each signal frame.

In some embodiments, based on the foregoing solution, the $i^{th}$ encoded frame further includes: a second field corresponding to the $i^{th}$ signal frame, and the second field is used for recording the encoded result of the $i^{th}$ signal frame; and the first disassembling unit 1402 is configured to: obtain the encoded result of the $i^{th}$ signal frame according to the second field.

In some embodiments, based on the foregoing solution, the number n is determined according to network status, and the number n is inversely correlated with the network status.

Figure 15:
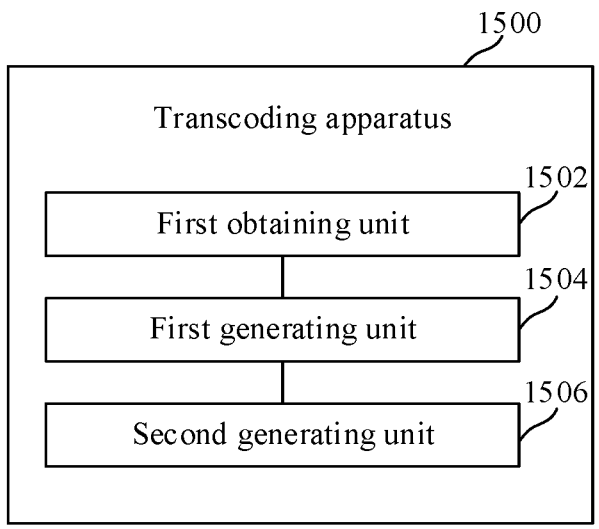
FIG. 15 is a block diagram of a transcoding apparatus according to an embodiment of this disclosure.

FIG. 15 is a block diagram of a transcoding apparatus according to an embodiment of this disclosure. The transcoding apparatus may be disposed in a device having a computing processing function, for example, may be disposed in a terminal or a server.

Referring to FIG. 15, a transcoding apparatus 1500 according to an embodiment of this disclosure includes: a first obtaining unit 1502, a first generating unit 1504, and a second generating unit 1506.

The first obtaining unit 1502 is configured to obtain an encoded result of an $i^{th}$ signal frame and encoded results corresponding to first n signal frames, the first n signal frames being signal frames located before the $i^{th}$ signal frame.

The first generating unit 1504 is configured to generate forward error correction encoded results corresponding to the first n signal frames according to the encoded results corresponding to the first n signal frames.

The second generating unit 1506 is configured to synthesize the encoded result of the $i^{th}$ signal frame and the forward error correction encoded results corresponding to the first n signal frames, to obtain an $i^{th}$ encoded frame, the $i^{th}$ encoded frame including a flag bit, the flag bit being used for indicating a number n, i being a positive integer, and n being a positive integer greater than or equal to 2.

In some embodiments, based on the foregoing solution, the first generating unit 1504 is configured to: decode the encoded results corresponding to the first n signal frames, to obtain decoded results corresponding to the first n signal frames; re-quantize the decoded results corresponding to the first n signal frames, to obtain quantization results corresponding to the first n signal frames; and code the quantization results corresponding to the first n signal frames, to generate the forward error correction encoded results corresponding to the first n signal frames.

In some embodiments, based on the foregoing solution, the first generating unit 1504 is configured to: perform entropy decoding on encoded results corresponding to the first n signal frames and perform entropy encoding on quantization results corresponding to the first n signal frames.

In some embodiments, based on the foregoing solution, the decoded results corresponding to the first n signal frames each include a subframe gain and excitation signal energy; and the first generating unit 1504 is configured to increase a value of the subframe gain and to equivalently reduce the excitation signal energy; perform quantization processing based on the excitation signal energy, to obtain a number of data bits; and when a number of data bits per unit time is less than a target bit rate, stop increasing the value of the subframe gain and stop reducing the excitation signal energy, and use a real-time value of the subframe gain and real-time excitation signal energy as the quantization results.

In some embodiments, based on the foregoing solution, the second generating unit 1506 is further configured to: according to the encoded result of the $i^{th}$ signal frame and a forward error correction encoded result corresponding to a previous signal frame, generate a designated encoded frame corresponding to the $i^{th}$ signal frame, where the designated encoded frame does not include a flag bit.

Figure 16:
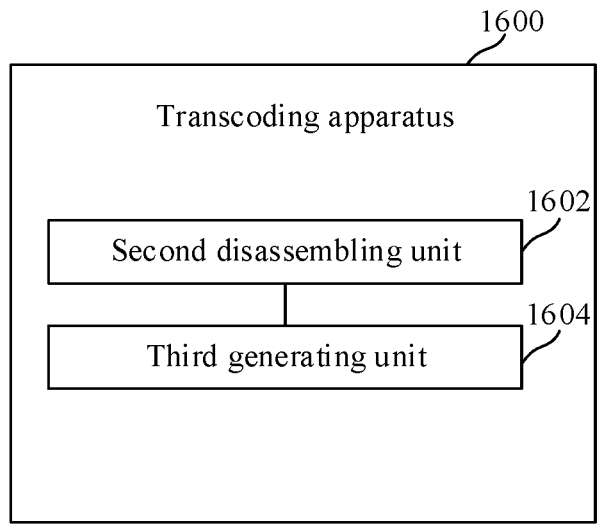
FIG. 16 is a block diagram of a transcoding apparatus according to an embodiment of this disclosure.

FIG. 16 is a block diagram of a transcoding apparatus according to an embodiment of this disclosure. The transcoding apparatus may be disposed in a device having a computing processing function, for example, may be disposed in a terminal or a server.

Referring to FIG. 16, a transcoding apparatus 1600 according to an embodiment of this disclosure includes a second disassembling unit 1602 and a third generating unit 1604.

The second disassembling unit 1602 is configured to: for an $i^{th}$ encoded frame, when the $i^{th}$ encoded frame includes a flag bit, disassemble the $i^{th}$ encoded frame, to obtain an encoded result of an $i^{th}$ signal frame and forward error correction encoded results corresponding to first n signal frames; the first n signal frames being signal frames located before the $i^{th}$ signal frame and the flag bit being used for indicating a number n; the forward error correction encoded results being used for correcting the first n signal frames, i being a positive integer, and n being a positive integer greater than or equal to 2; and the third generating unit 1604 is configured to generate, based on the encoded result of the $i^{th}$ signal frame, a bitstream after the $i^{th}$ encoded frame is transcoded.

In some embodiments, based on the foregoing solution, the third generating unit 1604 is further configured to: when a $j^{th}$ encoded frame corresponding to a $j^{th}$ signal frame in the first n signal frames is not obtained and the $i^{th}$ encoded frame is an encoded frame closest to the $j^{th}$ encoded frame, generate, according to a forward error correction encoded result corresponding to the $j^{th}$ signal frame, a bitstream after the $j^{th}$ encoded frame is transcoded; and the forward error correction encoded result of the $j^{th}$ signal frame is obtained by disassembling the $i^{th}$ encoded frame.

In some embodiments, based on the foregoing solution, the third generating unit 1604 is further configured to: when the $i^{th}$ encoded frame is not an encoded frame closest to the $j^{th}$ encoded frame, determine a target encoded frame closest to the $j^{th}$ encoded frame and generate, according to a forward error correction encoded result corresponding to the $j^{th}$ signal frame, a bitstream after the $j^{th}$ encoded frame is transcoded; the forward error correction encoded result of the $j^{th}$ signal frame is obtained by disassembling the target encoded frame.

In some embodiments, based on the foregoing solution, the second disassembling unit 1602 is further configured to: when the $i^{th}$ encoded frame does not include a flag bit, skip transcoding the $i^{th}$ encoded frame.

Figure 17:
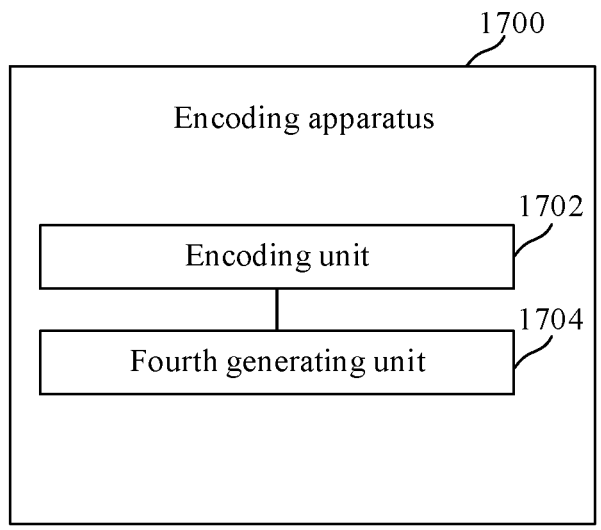
FIG. 17 is a block diagram of an encoding apparatus according to an embodiment of this disclosure.

FIG. 17 is a block diagram of an encoding apparatus according to an embodiment of this disclosure. The encoding apparatus may be disposed in a device having a computing processing function, for example, may be disposed in a terminal or a server.

Referring to FIG. 17, an encoding apparatus 1700 according to an embodiment of this disclosure includes an encoding unit 1702 and a fourth generating unit 1704.

The encoding unit 1702 is configured to code an $i^{th}$ signal frame, to obtain an encoded result of the $i^{th}$ signal frame, i being a positive integer; and perform forward error correction encoding on first n signal frames, to obtain forward error correction encoded results corresponding to the first n signal frames, the first n signal frames being signal frames located before the $i^{th}$ signal frame.

The fourth generating unit 1704 is configured to synthesize the encoded result of the $i^{th}$ signal frame and the forward error correction encoded results corresponding to the first n signal frames, to obtain an $i^{th}$ encoded frame corresponding to the $i^{th}$ signal frame, the $i^{th}$ encoded frame including a flag bit, the flag bit being used for indicating a number n, and n being a positive integer greater than or equal to 2.

In some embodiments, based on the foregoing solution, the encoding unit 1702 is further configured to determine the number n according to network status.

In some embodiments, based on the foregoing solution, the number n is inversely correlated with the network status.

In some embodiments, based on the foregoing solution, a first bit rate is greater than n second bit rates, the first bit rate is a bit rate of the encoded result of the $i^{th}$ signal frame, the n second bit rates are bit rates of the forward error correction encoded results corresponding to the first n signal frames, and one forward error correction encoded result corresponds to one second bit rate.

In some embodiments, based on the foregoing solution, the first bit rate and the n second bit rates descend in a back-to-front order of the $i^{th}$ signal frame and the first n signal frames.

In some embodiments, based on the foregoing solution, the encoding unit 1702 is further configured to adjust n second bit rates according to the packet loss feedback information included in the receiving status information fed back by the receiving end, where the n second bit rates are bit rates of the forward error correction encoded results corresponding to the first n signal frames, and one forward error correction encoded result corresponds to one second bit rate.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

Figure 18:
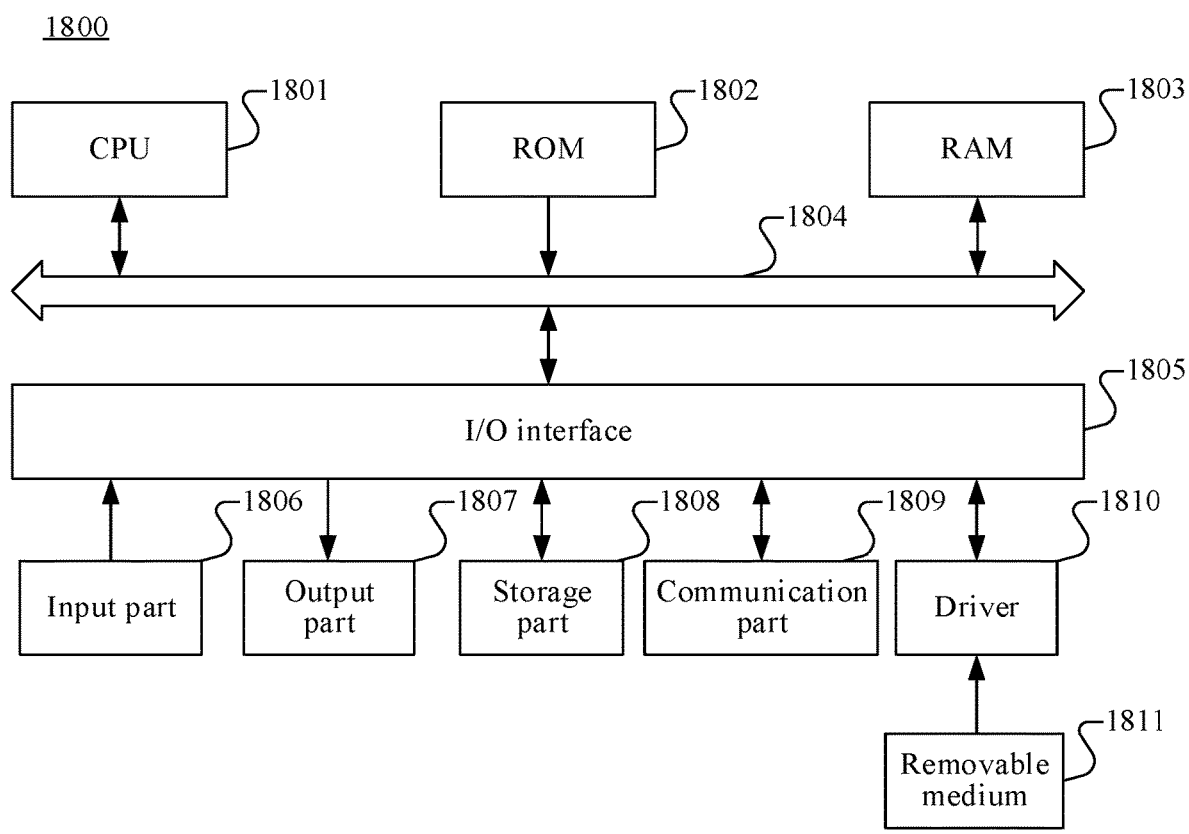
FIG. 18 is a schematic structural diagram of a computer system adapted to implement an electronic device according to an embodiment of this disclosure.

FIG. 18 is a schematic structural diagram of a computer system adapted to implement an electronic device according to an embodiment of this disclosure.

The computer system 1800 of the electronic device shown in FIG. 18 is merely an example, and does not constitute any limitation on functions and use ranges of the embodiments of this disclosure.

As shown in FIG. 18, the computer system 1800 includes a central processing unit (CPU) 1801, which may perform various proper actions and processing based on a program stored in a read-only memory (ROM) 1802 or a program loaded from a storage part 1808 into a random access memory (RAM) 1803, for example, perform the method described in the foregoing embodiment. In the RAM 1803, various programs and data required for system operations are further stored. The CPU 1801, the ROM 1802, and the RAM 1803 are connected to each other through a bus 1804. An input/output (I/O) interface 1805 is also connected to the bus 1804.

The following components are connected to an I/O interface 1805: an input part 1806, including keyboard, mouse, and the like; an output part 1807, including a cathode ray tube (CRT), a liquid crystal display (LCD), a speaker, and the like; a storage part 1808, including a hard disk and the like; and a communication part 1809 of a network interface card, including a Local Area Network (LAN) card, a modem, and the like. The communication part 1809 performs communication processing by using a network such as the Internet. A drive 1810 is also connected to the I/O interface 1805 as required. A removable medium 1811, such as a magnetic disk, an optical disc, a magneto-optical disk, or a semiconductor memory, is installed on the driver 1810 as required, so that a computer program read from the removable medium is installed into the storage part 1808 as required.

In some embodiments, the processes described above with reference to the flowchart may be implemented as a computer software program. For example, an embodiment of this application includes a computer program product. The computer program product includes a computer program stored in a computer-readable medium. The computer program includes a computer program used for performing a method shown in the flowchart. In such an embodiment, by using the communication part 1809, the computer program may be downloaded and installed from a network, and/or installed from the removable medium 1811. When the computer program is executed by the CPU 1801, the above functions defined in the system of this disclosure are performed.

The computer-readable medium shown in the embodiments of this disclosure may be a computer-readable signal medium or a computer-readable storage medium or any combination of the two. The computer-readable storage medium includes, but is not limited to, an electric, magnetic, optical, electromagnetic, infrared, or semi-conductive system, apparatus, or component, or any combination of the above. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the embodiments of this disclosure, the computer-readable storage medium may be any tangible medium including or storing a program, and the program may be used by or in combination with an instruction execution system, apparatus or component. In the embodiments of this disclosure, the computer-readable signal medium may include a data signal propagated in a baseband or as part of a carrier, and stores a computer-readable computer program. The propagated data signal may be in a plurality of forms, including but not limited to, an electromagnetic signal, an optical signal, or any appropriate combination thereof. The computer-readable signal medium may alternatively be any computer-readable medium other than the computer-readable storage medium. The computer-readable medium may be configured to send, propagate, or transmit a program configured to be used by or in combination with an instruction execution system, apparatus, or device. The computer program included in the computer-readable medium may be transmitted by using any suitable medium, including but not limited to: a wireless medium, a wire, or the like, or any suitable combination thereof.

In another aspect, an embodiment of this disclosure further provides a computer-readable medium. The computer-readable medium may be included in the electronic device described in the above embodiments, or may exist alone without being assembled into the electronic device. The computer-readable medium carries one or more programs, when the one or more programs are executed by the electronic device, the electronic device is configured to implement the encoding method, the decoding method, or the transcoding method described in the foregoing embodiments.

In another aspect, an embodiment of this disclosure further provides a computer program product or a computer program, the computer program product or computer program including computer instructions, the computer instructions being stored in a computer-readable storage medium. A processor of an electronic device reads the computer instructions from the computer-readable storage medium, and the processor executes the computer instructions, to cause the computer device to perform the encoding method, decoding method, or transcoding method provided in the foregoing embodiments.

Through the foregoing description of implementations, a person skilled in the art easily understands that the exemplary implementations described above may be implemented by software or may be implemented in the form of software in combination with necessary hardware. Therefore, the technical solutions of the implementations of this disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the implementations of this disclosure.

What is claimed is:

1. An encoding method, comprising:
   encoding, with an electronic device, an $i^{th}$ signal frame, to obtain an encoded result of the $i^{th}$ signal frame, i being a positive integer;
   performing, with the electronic device, forward error correction encoding on first n signal frames, to obtain forward error correction encoded results corresponding to the first n signal frames, the first n signal frames being signal frames located before the $i^{th}$ signal frame; and
   synthesizing, with the electronic device, the encoded result of the $i^{th}$ signal frame and the forward error correction encoded results corresponding to the first n signal frames, to obtain an $i^{th}$ encoded frame corresponding to the $i^{th}$ signal frame, the $i^{th}$ encoded frame comprising a flag bit, the flag bit being for indicating a number n, and n being a positive integer greater than or equal to 2.

2. The encoding method according to claim 1, wherein the method further comprises:
   determining the number n according to network status.

3. The encoding method according to claim 2, wherein the number n is inversely correlated with the network status.

4. The encoding method according to claim 1, wherein a first bit rate is a bit rate of the encoded result of the $i^{th}$ signal frame, n second bit rates are bit rates of the forward error correction encoded results corresponding to the first n signal frames, the first bit rate is greater than the n second bit rates, and one forward error correction encoded result corresponds to one second bit rate.

5. The encoding method according to claim 4, wherein the first bit rate and the n second bit rates descend in a back-to-front order of the $i^{th}$ signal frame and the first n signal frames.

6. The encoding method according to claim 1, further comprising:
   obtaining receiving status information from a receiving end, the receiving status information comprising packet loss feedback information; and
   adjusting n second bit rates according to the packet loss feedback information, wherein the n second bit rates are bit rates of the forward error correction encoded results corresponding to the first n signal frames, and one forward error correction encoded result corresponding to one second bit rate.

7. The encoding method according to claim 6, wherein the adjusting the n second bit rates according to the packet loss feedback information comprises:
   increasing the n second bit rates in response to the packet loss feedback information indicates that the packet loss rate is greater than a threshold.

8. The encoding method according to claim 6, wherein the adjusting the n second bit rates according to the packet loss feedback information comprises:
   decreasing the n second bit rates in response to the packet loss feedback information indicates that the packet loss rate is less than a threshold.

9. A decoding method, comprising:
   in response to an $i^{th}$ encoded frame comprising a flag bit, disassembling, with an electronic device, the $i^{th}$ encoded frame to obtain an encoded result of an $i^{th}$ signal frame and forward error correction encoded results corresponding to first n signal frames, the first n signal frames being signal frames located before the $i^{th}$ signal frame and the flag bit being for indicating a number n, the forward error correction encoded results being for correcting the first n signal frames, i being a positive integer, and n being a positive integer greater than or equal to 2; and
   decoding, with the electronic device, the encoded result of the $i^{th}$ signal frame to obtain the $i^{th}$ signal frame.

10. The decoding method according to claim 9, wherein the method further comprises: in response to failing to obtain a $j^{th}$ encoded frame corresponding to a $j^{th}$ signal frame in the first n signal frames and the $i^{th}$ encoded frame is an encoded frame closest to the $j^{th}$ encoded frame, decoding a forward error correction encoded result of the $j^{th}$ signal frame to obtain a decoded result, and generating the $j^{th}$ signal frame according to the decoded result, wherein the forward error correction encoded result of the $j^{th}$ signal frame is obtained by disassembling the $i^{th}$ encoded frame.

11. The decoding method according to claim 9, wherein the method further comprises:
   in response to failing to obtain a $j^{th}$ encoded frame corresponding to a $j^{th}$ signal frame in the first n signal frames and the $i^{th}$ encoded frame being not an encoded frame closest to the $j^{th}$ encoded frame,
   determining a target encoded frame closest to the $j^{th}$ encoded frame,
   decoding a forward error correction encoded result of the $j^{th}$ signal frame to obtain a decoded result, and generating the $j^{th}$ signal frame according to the decoded result, wherein the forward error correction encoded result of the $j^{th}$ signal frame is obtained by disassembling the target encoded frame.

12. The decoding method according to claim 9, wherein the $i^{th}$ encoded frame further comprises: an indication bit and a first field corresponding to each signal frame in the first n signal frames, the indication bit is for indicating a length of a forward error correction encoded result of each signal frame, and the first field is for recording the forward error correction encoded result of each signal frame; and
   the disassembling the $i^{th}$ encoded frame comprises:
      obtaining the forward error correction encoded result of the each signal frame according to the indication bit and the first field corresponding to the each signal frame.

13. The decoding method according to claim 9, wherein the $i^{th}$ encoded frame further comprises a second field corresponding to the $i^{th}$ signal frame, and the second field is for recording the encoded result of the $i^{th}$ signal frame; and
   the disassembling the $i^{th}$ encoded frame comprises obtaining the encoded result of the $i^{th}$ signal frame according to the second field.

14. The decoding method according to claim 9, wherein the number n is determined according to network status.

15. The decoding method according to claim 14, wherein the number n is inversely correlated with the network status.

16. A transcoding method, comprising:
   obtaining, with an electronic device, an encoded result of an $i^{th}$ signal frame and encoded results corresponding to first n signal frames, the first n signal frames being signal frames located before the $i^{th}$ signal frame;
   generating, with the electronic device, forward error correction encoded results corresponding to the first n signal frames according to the encoded results corresponding to the first n signal frames; and
   synthesizing, with the electronic device, the encoded result of the $i^{th}$ signal frame and the forward error correction encoded results corresponding to the first n signal frames, to obtain an $i^{th}$ encoded frame, the $i^{th}$ encoded frame comprising a flag bit, the flag bit being for indicating a number n, i being a positive integer, and n being a positive integer greater than or equal to 2.

17. The transcoding method according to claim 16, wherein the generating the forward error correction encoded results corresponding to the first n signal frames according to the encoded results corresponding to the first n signal frames comprises:
  decoding the encoded results corresponding to the first n signal frames to obtain decoded results corresponding to the first n signal frames;
  requantizing the decoded results corresponding to the first n signal frames to obtain quantization results corresponding to the first n signal frames; and
  encoding the quantization results corresponding to the first n signal frames, to generate the forward error correction encoded results corresponding to the first n signal frames.

18. The transcoding method according to claim 17, wherein the decoding the encoded results corresponding to the first n signal frames comprises:
  performing entropy decoding on the encoded results corresponding to the first n signal frames; and
  the encoding the quantization results corresponding to the first n signal frames comprises:
  performing entropy encoding on the quantization results corresponding to the first n signal frames.

19. The transcoding method according to claim 17, wherein the decoded results corresponding to the first n signal frames each comprise a subframe gain and excitation signal energy;
  the requantizing the decoded results corresponding to the first n signal frames to obtain the quantization results corresponding to the first n signal frames comprises:
    increasing a value of the subframe gain and equivalently decreasing the excitation signal energy;
    performing quantization processing based on the excitation signal energy to obtain a number of data bits; and
  in response to the number of the data bits per unit time being less than a target bit rate,
    stopping increasing the value of the subframe gain,
    stopping decreasing the excitation signal energy, and
    determining a real-time value of the subframe gain and a real-time value of the excitation signal energy as the quantization results.

20. The transcoding method according to claim 16, further comprising:
  generating a designated encoded frame corresponding to the $i^{th}$ signal frame according to the encoded result of the $i^{th}$ signal frame and a forward error correction encoded result corresponding to a previous signal frame, wherein the designated encoded frame does not comprise the flag bit.

* * * * *